United States Patent
Fujita et al.

(10) Patent No.: US 7,936,657 B2
(45) Date of Patent: May 3, 2011

(54) APPARATUS FOR INITIALIZING AND METHOD OF MANUFACTURING OPTICAL DISC, AND INITIALIZATION REFERENCE PLATE

(75) Inventors: Goro Fujita, Kanagawa (JP); Kimihiro Saito, Saitama (JP)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 12/463,648

(22) Filed: May 11, 2009

(65) Prior Publication Data

US 2009/0285059 A1 Nov. 19, 2009

(30) Foreign Application Priority Data

May 16, 2008 (JP) .................. 2008-129734

(51) Int. Cl.
*G11B 7/00* (2006.01)

(52) U.S. Cl. ....................................................... 369/103

(58) Field of Classification Search .................. 369/103, 369/47.27, 44.26, 275.3, 275.4

See application file for complete search history.

(56) References Cited

U.S. PATENT DOCUMENTS 7,193,953 B2 * 3/2007 Kim .............................. 369/103

FOREIGN PATENT DOCUMENTS

| JP | 11-328724 A | 11/1999 |
| JP | 2000-163795 A | 6/2000 |
| JP | 2001-325748 A | 11/2001 |
| JP | 2003-132586 A | 5/2003 |
| JP | 2007-042149 A | 2/2007 |
| JP | 2008-017433 A | 1/2008 |
| WO | WO 2006/111972 A2 | 10/2006 |

* cited by examiner

*Primary Examiner* — Nabil Z Hindi
(74) *Attorney, Agent, or Firm* — Wolf, Greenfield & Sacks, P.C.

(57) ABSTRACT

An embodiment of the present invention includes rotating an integrated disc formed by temporarily fixing an initialization reference plate to an uninitialized optical disc that is an optical disc to be irradiated with a light beam of light having a predetermined or higher intensity to record information as a recording mark. The initialization reference plate has a reference part that reflects at least a part of a servo light beam of servo light intended for servo control. The reference part contains information that indicates the position of a track of the optical disc for the recording mark to be formed on, in the form of a track of pit-and-projection pattern.

18 Claims, 24 Drawing Sheets

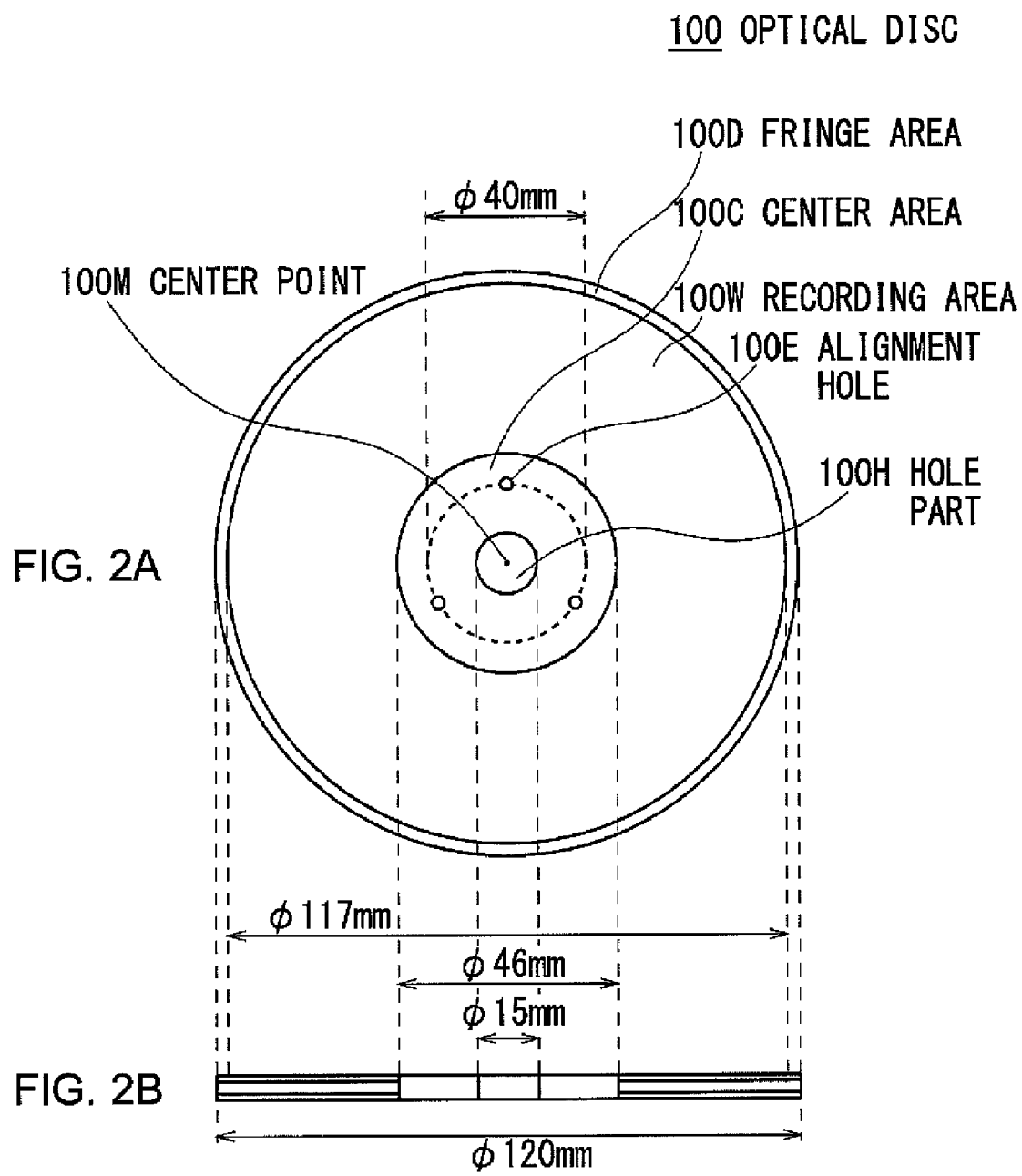

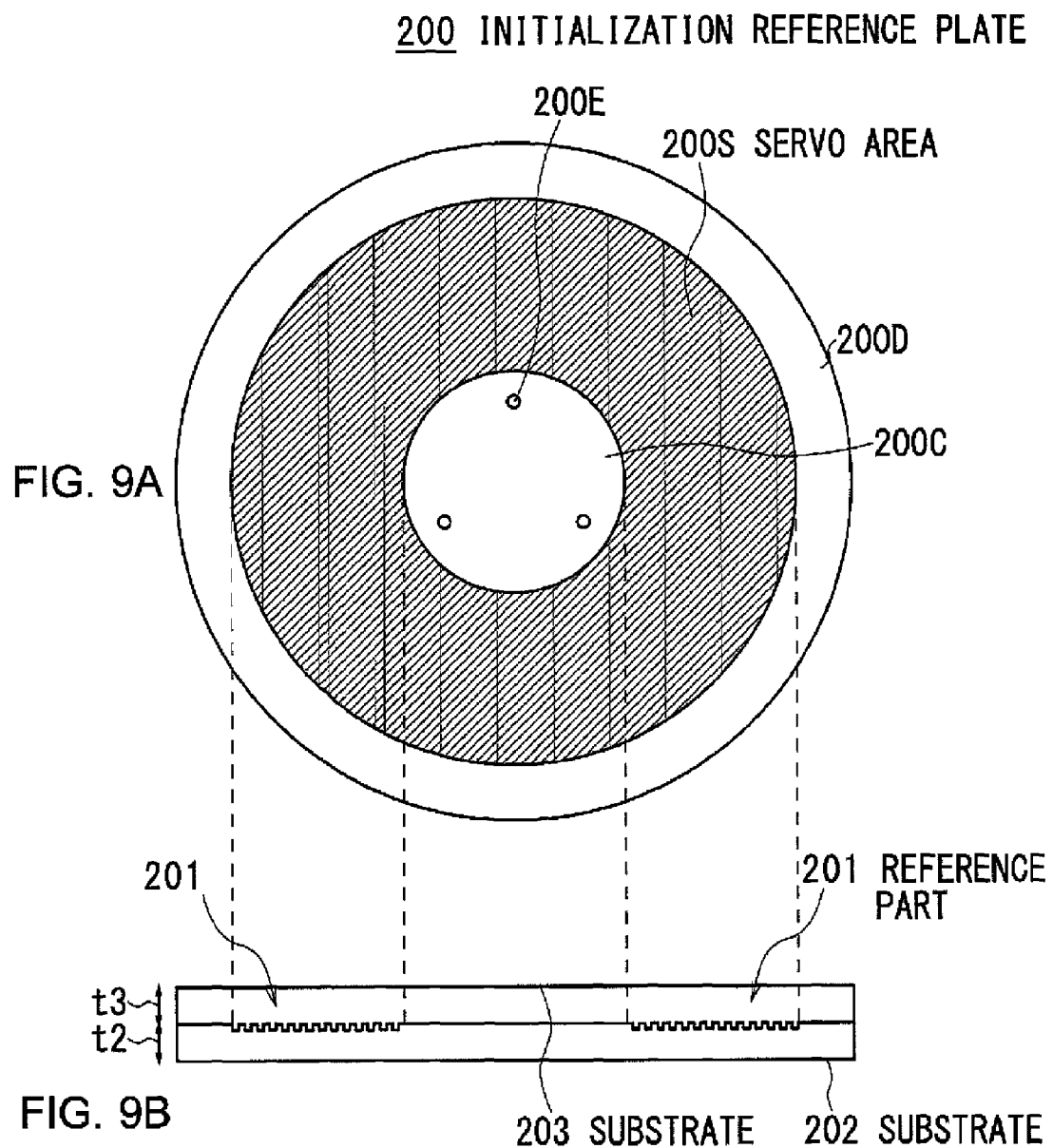

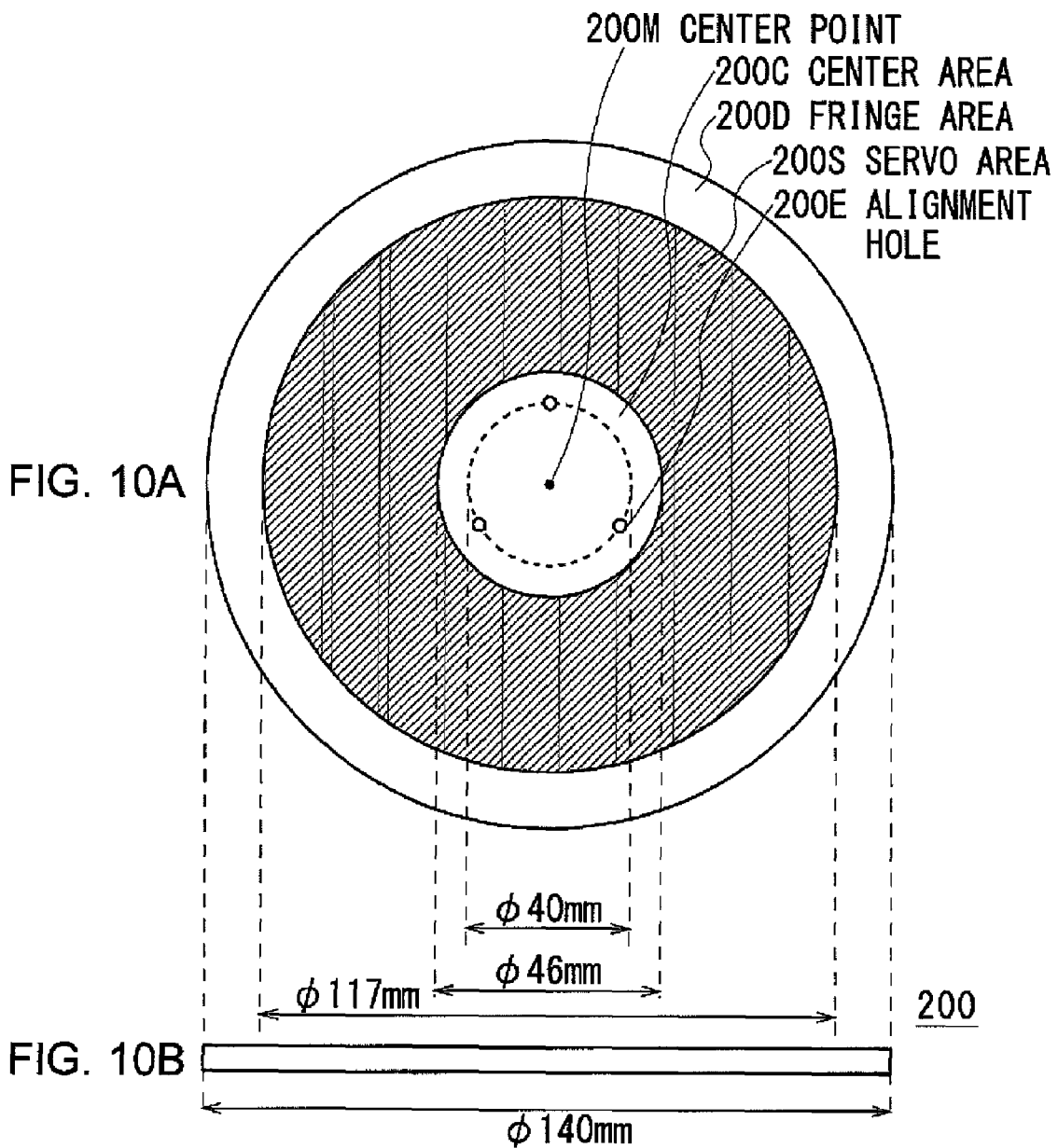

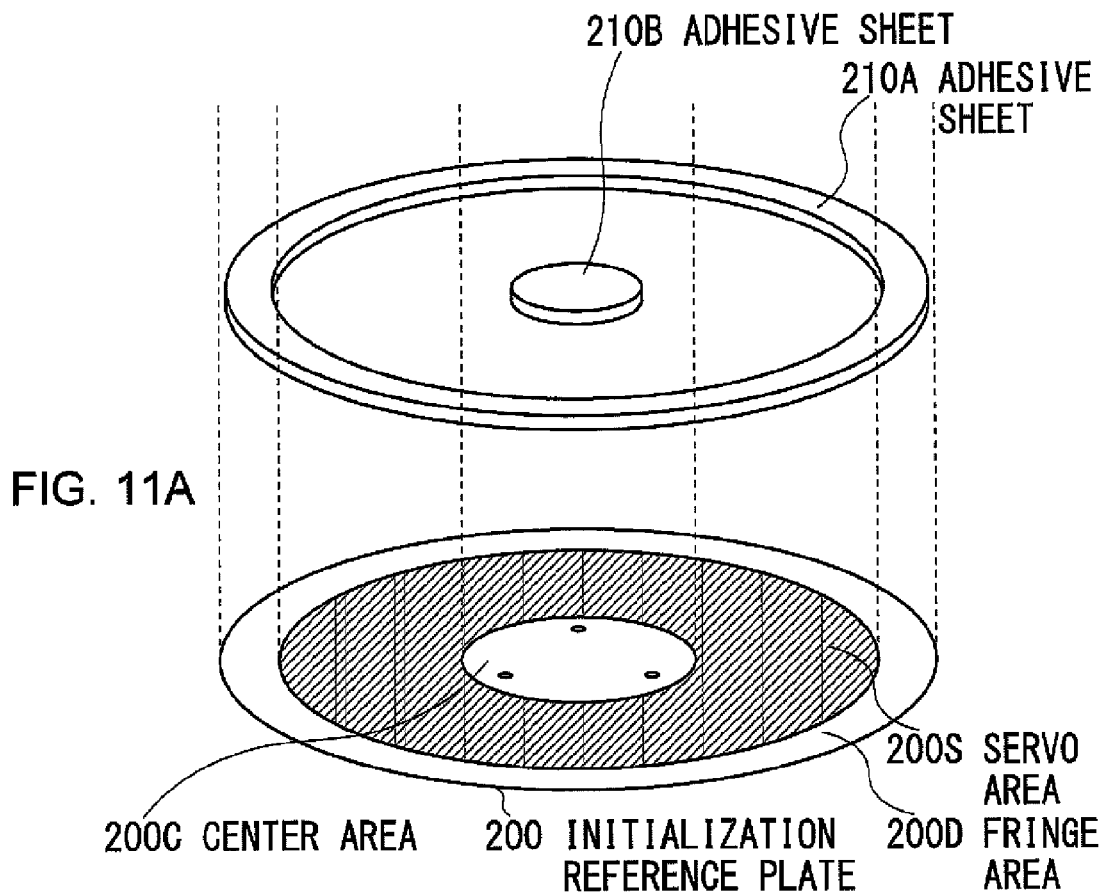
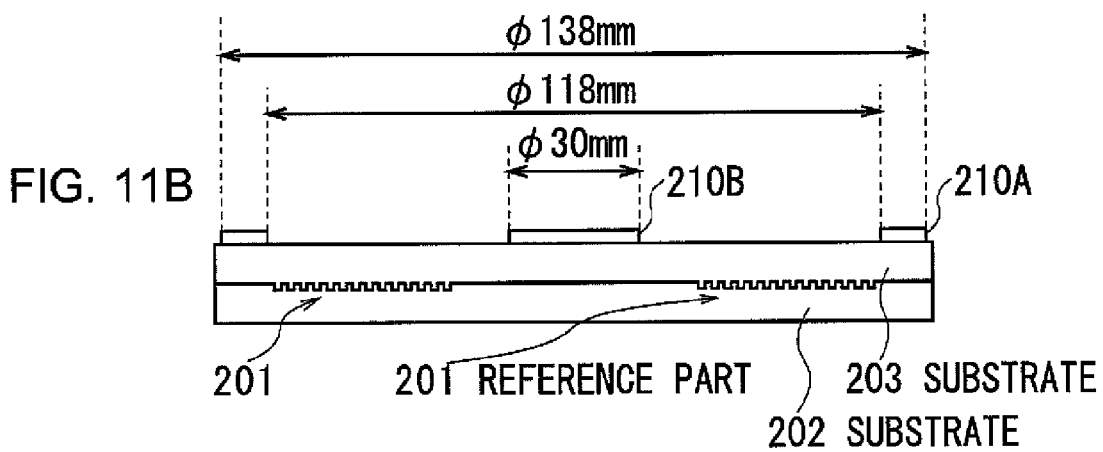

APPARATUS FOR INITIALIZING AND METHOD OF MANUFACTURING OPTICAL DISC, AND INITIALIZATION REFERENCE PLATE

BACKGROUND OF THE INVENTION

1. Field of the Invention

The present invention relates to an optical disc, an apparatus for initializing and a method of manufacturing an optical disc, and an initialization reference plate, and is suitably applicable, for example, to an optical disc apparatus which records a plurality of recording marks on a single recording layer in a thickness direction.

2. Description of the Related Art

Optical disc apparatuses that irradiate an optical disc such as compact disc (CD), digital versatile disc (DVD), and Blu-ray Disc (registered trademark, referred to as BD, hereinafter) with a light beam and read the reflected light for information reproduction have been in widespread use.

Such hitherto known optical disc apparatuses also perform information recording by irradiating the optical disc with a light beam so that the optical disc causes a local change in reflectance etc.

For the optical disc, it is known that a light spot of approximately $\lambda/NA$ ($\lambda$: the wavelength of the light beam, NA: numerical aperture) in size is formed on the optical disc, with resolution proportional to this value. For example, an optical disc of BD type having a diameter of 120 mm can record data as much as approximately 25 GB.

Optical discs are to record a variety of information including various types of contents such as music contents and video contents and various types of data such as computer data. In particular, videos have gotten higher in resolution and music higher in quality recently with increased amounts of information, and the number of contents that are desired to be recorded on a single optical disc has been on the increase. A further enhancement in capacity has thus been required of the optical discs.

Consider now the case of providing a plurality of recording layers in a single optical disc. As shown in FIG. 1A, if the optical disc is formed by stacking different types of materials like reflecting layers and recording layers as in the hitherto known DVD and BD systems, the complicated manufacturing steps can increase the manufacturing cost etc.

Some optical disc apparatuses that have been proposed for the sake of increased capacity record a plurality of layers of recording marks (hereinafter, referred to as mark layers) as if stacked in a uniform recording layer of an optical disc (refer to, e.g., Jpn. Pat. Appln. Laid-Open Publication No. 2008-071433).

As shown in FIG. 1B, an optical disc DK corresponding to an optical disc apparatus of such configuration has a recording layer DKw that is uniform inside, without any possible position guideline in the recording layer. The optical disc DK is thus provided with an additional reflecting layer DKs that includes servo tracks or the like.

More specifically, the optical disc apparatus focuses a predetermined servo light beam LS on a servo track of the reflecting layer DKs to be irradiated with the servo light beam LS (hereinafter, this servo track will be referred to as a desired servo track TRG). The optical disc apparatus further focuses a light beam LB having an optical axis coincident with that of the servo light beam LS upon an intended position (hereinafter, referred to as a target mark position PG) in the recording layer DKw.

SUMMARY OF THE INVENTION

Now, in order to irradiate different positions in the thickness direction of the optical disc DK with the light beam LB and the servo light beam LS through an identical objective lens, the optical disc apparatus of such configuration needs to add a spherical aberration to either one of the light beams. This requires that the optical disc apparatus provide separate optical paths for the light beam LB and the servo light beam LS, respectively, which complicates the configuration.

A technique has thus been desired that can irradiate a target mark position PG in the recording layer DKw with the light beam LB without irradiating the reflecting layer DKs with the servo light beam LS.

The present invention has been achieved in view of the foregoing, and is to propose an apparatus for initializing and a method of manufacturing an optical disc that are capable of manufacturing an optical disc in whose recording layer a target mark position can be irradiated with an information light beam without a reflecting layer being irradiated with a servo light beam, and an initialization reference plate for use in manufacturing the optical disc.

To solve the foregoing problem, an apparatus for initializing an optical disc according to an aspect of the present invention includes: a rotating unit that rotates an optical disc to be irradiated with light of predetermined or higher intensity to record information as a recording mark and an initialization reference plate having a reference part with the initialization reference plate temporarily fixed to the optical disc, the reference part reflecting at least a part of servo light intended for servo control and containing information that indicates a position of a track of the optical disc for the recording mark to be formed on; an information light source that emits information light having the predetermined or higher intensity; a servo light source that emits the servo light; an objective lens that collects the servo light and the information light for irradiation; an objective lens driving unit that drives the objective lens so that the servo light focuses on a desired servo position of the reference part; a focal point separating unit that adjusts spherical aberration of the information light to separate a focal point of the information light from a focal point of the servo light by an arbitrary distance in a depth direction in which the objective lens approaches and draws away from the optical disc; and a control unit that controls the information light source and the objective lens driving unit so that a servo mark area of the optical disc for a recording mark intended for servo control to be formed in is irradiated with the information light.

Consequently, the apparatus for initializing an optical disc can form a recording mark intended for servo control in the servo mark area of the optical disc with reference to the reference part, so that servo control can be performed by using the recording mark intended for servo control when recording information on the optical disc in which the recording mark intended for servo control is formed.

A method of manufacturing an optical disc according to an aspect of the present invention includes: a fixing step of fixing an initialization reference plate having a reference part to an optical disc to be irradiated with light of predetermined or higher intensity to record information as a recording mark, the reference part reflecting at least a part of servo light intended for servo control and containing information that indicates a position of a track of the optical disc for the recording mark to be formed on; a servo control recording mark forming step of driving an objective lens that collects the servo light and information light having the predetermined or higher intensity so that the servo light focuses on a desired servo position of the reference part, and adjusting spherical aberration of the information light to separate a focal point of the information light from a focal point of the servo light by an arbitrary distance in a depth direction in which the objective lens approaches and draws away from the optical disc, thereby adjusting the focal point of the information light to a servo mark area of the optical disc for a recording mark intended for servo control to be formed in and irradiating the servo mark area with the information light to form a recording mark intended for servo control in the servo mark area; and a separating step of separating the initialization reference plate from the optical disc.

Consequently, the method of manufacturing an optical disc can form a recording mark intended for servo control in the servo mark area of the optical disc with reference to the reference part, so that servo control can be performed by using the recording mark intended for servo control when recording information on the optical disc in which the recording mark intended for servo control is formed.

An initialization reference plate according to an aspect of the present invention includes a reference part that is formed so as to correspond to a servo mark area of an optical disc to be irradiated with light of predetermined or higher intensity to record information as a recording mark, contains information that indicates a position of a track of the optical disc for the recording mark to be recorded on, and reflects at least a part of predetermined servo light, the servo mark area for a recording mark intended for servo control to be recorded on.

Consequently, the initialization reference plate makes it possible to form a recording mark intended for servo control in the servo mark area of the optical disc with reference to the reference part, so that servo control can be performed by using the recording mark intended for servo control when recording information on the optical disc in which the recording mark intended for servo control is formed.

According to the present invention, it is possible to form a recording mark intended for servo control in the servo mark area of the optical disc with reference to the reference part, so that servo control can be performed by using the recording mark intended for servo control when recording information on the optical disc in which the recording mark intended for servo control is formed. This makes it possible to achieve an apparatus for initializing and a method of manufacturing an optical disc that are capable of manufacturing an optical disc in whose recording layer a target mark position can be irradiated with an information light beam without a reflecting layer being irradiated with a servo light beam, and an initialization reference plate for use in manufacturing the optical disc.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2A and 2B are schematic diagrams showing the configuration (1) of an optical disc according to a first embodiment;

FIGS. 9A and 9B are schematic diagrams showing the configuration (1) of an initialization reference plate;

FIGS. 10A and 10B are schematic diagrams showing the configuration (2) of the initialization reference plate;

FIGS. 11A and 11B are schematic diagrams for explaining the bonding of adhesive sheets;

DETAILED DESCRIPTION OF THE PREFERRED EMBODIMENTS

Hereinafter, an embodiment of the present invention will be described in detail with reference to the drawings.

(1) First Embodiment

(1-1) Configuration of Optical Disc

Initially, description will be given of the optical disc 100 which is used as an optical information recording medium according to a first embodiment of the present invention. As shown in the external view of FIG. 2A and the cross-sectional view of FIG. 2B, the optical disc 100 is formed in a disc shape having a diameter of approximately 120 mm as a whole, like hitherto known CD, DVD, and BD. A hole part 100H of approximately 15 mm in diameter is made in the center.

The optical disc 100 is provided with a center area 100C, a recording area 100W, and a fringe area 100D from the hole part 100H to the periphery. More specifically, the center area 100C, the recording area 100W, and the fringe area 100D of the optical disc 100 are formed with outside diameters of approximately 46 mm, approximately 117 mm, and approximately 120 mm, respectively. Information is only recorded on the recording area 100W which ranges from approximately 46 mm to approximately 117 mm in diameter.

Three alignment holes 100E of the order of approximately 1 mm are formed at almost regular intervals on a circle of approximately 40 mm in diameter (shown by the broken line; details will be given later).

Figure 3:
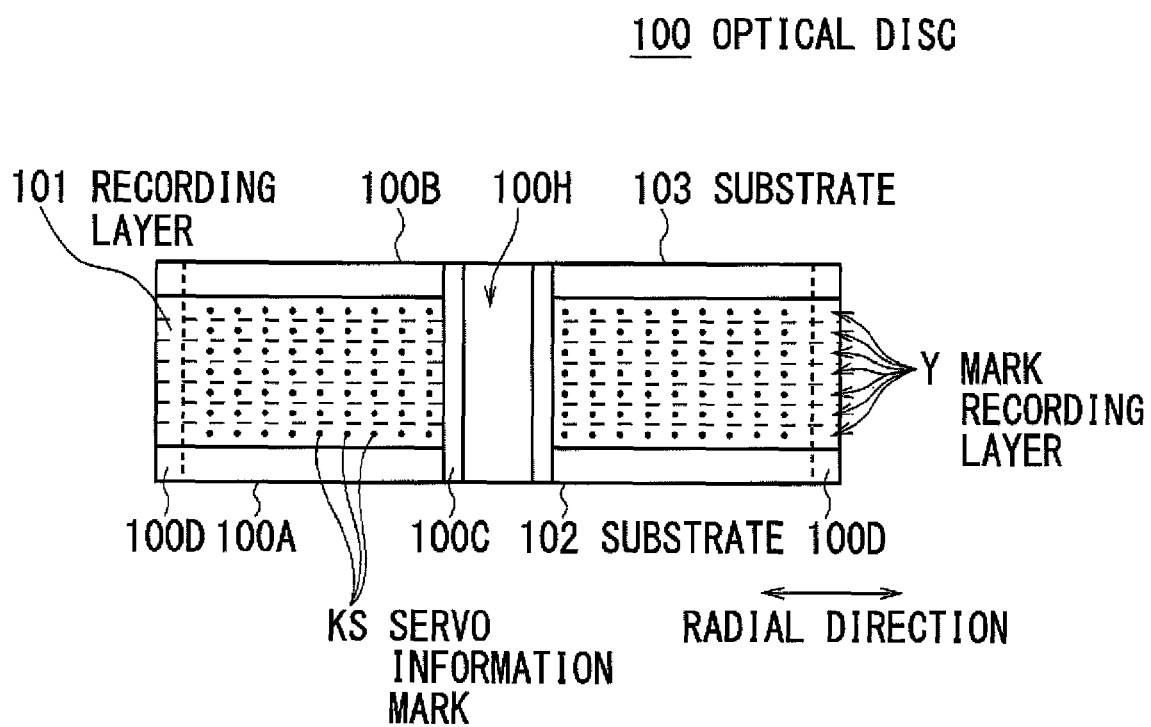
FIG. 3 is a schematic diagram showing the configuration (2) of the optical disc according to the first embodiment.

As shown in the sectional view of FIG. 3, the optical disc 100 has a recording layer 101 for recording information in the center. The recording layer 101 is sandwiched between substrates 102 and 103 on both sides. The center area 100C has no recording layer 101 at all.

The recording layer 101 is supposed to be irradiated with a laser beam LB. If the light beam LB has a recording light intensity for use in recording processing, the recording layer 101 forms a recording mark RM made of, e.g., a pore in the portion where the light beam LB is collected to reach or exceed a predetermined intensity (i.e., in the vicinity of a focal point FI).

Figure 4A:
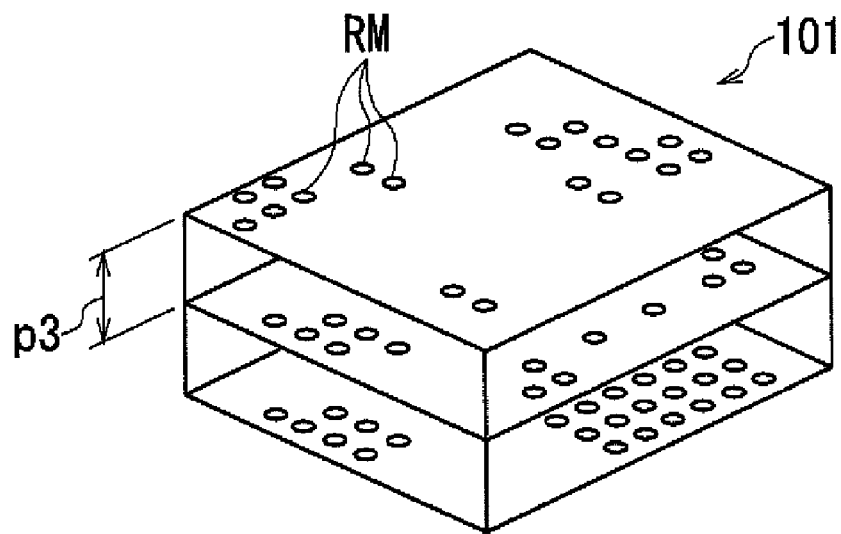
FIGS. 4A and 4B are schematic diagrams for explaining the generation of recording marks.
Figure 4B:
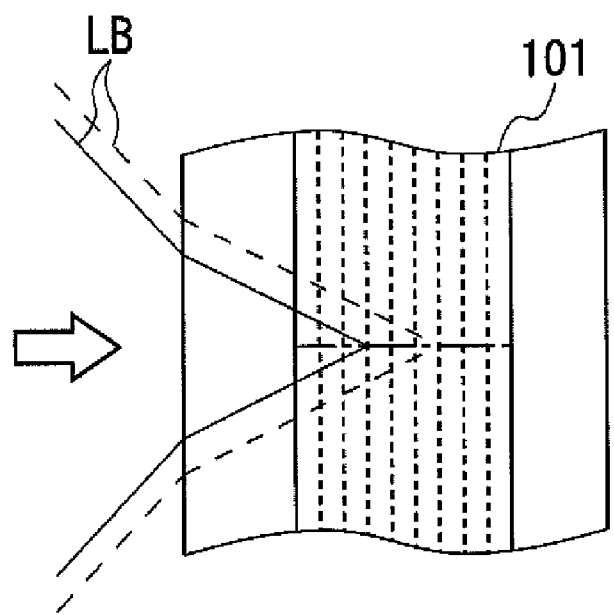

The recording layer 101 is designed so that the thickness t1 of the recording layer 101 is sufficiently greater than the height RMh of the recording mark RM. This makes it possible to switch the position of the light beam LB in the recording layer 101 in the thickness direction of the optical disc 100 while recording marks RM are recorded, whereby multilayer recording can be achieved such that a plurality of mark recording layers Y are stacked in the thickness direction of the optical disc 100 as shown in FIGS. 4A and 4B.

The mark recording layers Y refer to apparent layers, and no boundary actually exists between the mark recording layers Y. FIG. 4A shows a situation where information is recorded depending on the presence or absence of recording marks RM that indicate a single bit of information each, whereas recording marks RM may be formed in a plurality of possible lengths.

Here, the distance from the focal point FI of the light beam LB to a first surface 100A (hereinafter, this distance will be referred to as a depth) is adjusted within the recording layer 101 of the optical disc 100, whereby the depths of the recording marks RM are changed.

If the light beam LB has a mark reading light intensity which is a lower light intensity for use in reproduction processing and a recording mark RM is recorded at the position of the focal point FI, the recording layer 101 reflects the light beam LB due to a difference in refractive index between the recording mark RM and its surroundings. The recording layer 101 thereby produces a reflected light beam LBR from the recording mark RM that is recorded in the target mark position.

The recording layer 101 is uniformly formed without any guideline for the irradiation of the light beam LB, such as a signal recording layer, groove, and land. The recording layer 101 instead has servo information marks KS which are intended for position control. For example, the servo information marks KS are made of pores as with recording marks RM.

In the recording layer 101, recording marks RM are formed in a spiral configuration on each mark recording layer Y to form tracks TR of spiral shape. When the optical disc 100 is rotated, target mark positions PG on the tracks TR of the recording layer 101 are irradiated with the light beam LB in succession. Note that the tracks TR refer to apparent tracks, and no boundary actually exists between the tracks TR.

Figure 5A:
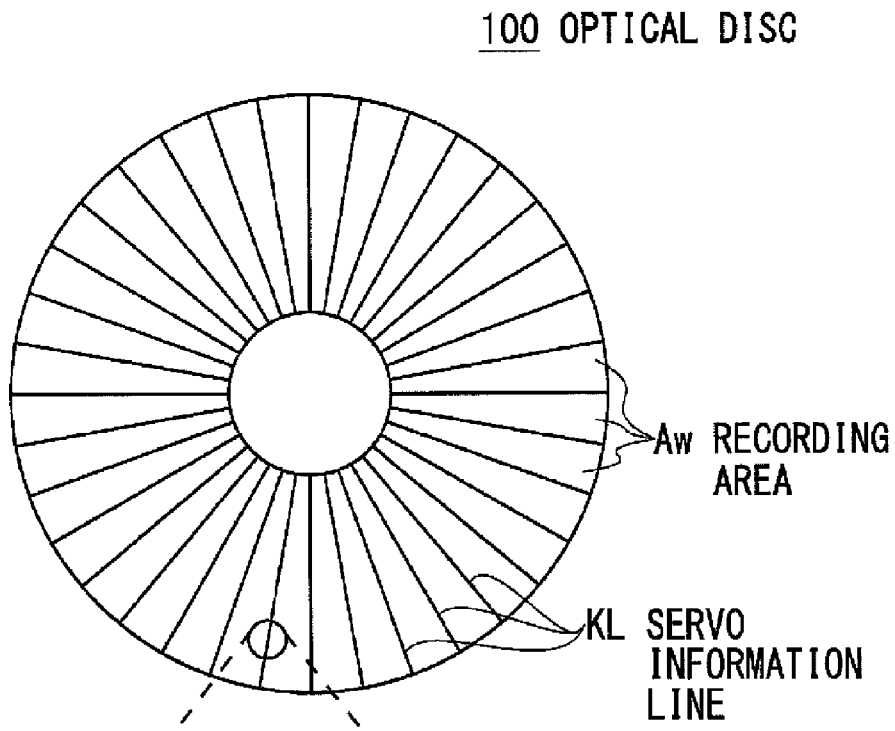
FIGS. 5A and 5B are schematic diagrams showing the configuration and layout of servo mark areas according to the first embodiment.
Figure 5B:
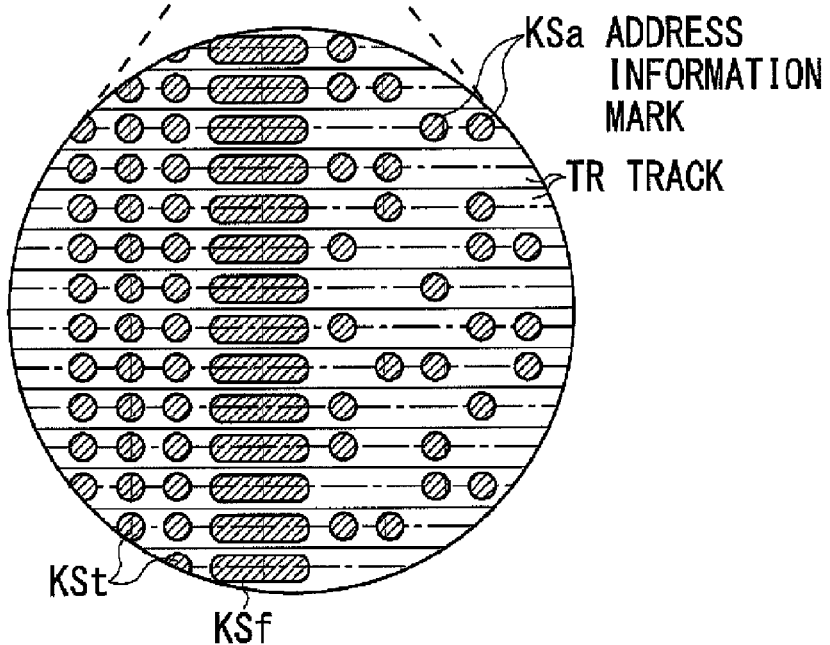

As shown in FIG. 5B, servo information marks KS are successively formed in similar positions on adjoining tracks TR for recording marks RM to be formed on. The servo information marks KS thereby form servo information lines KL which radiate from the center to the periphery of the optical disc 100.

Figure 6:
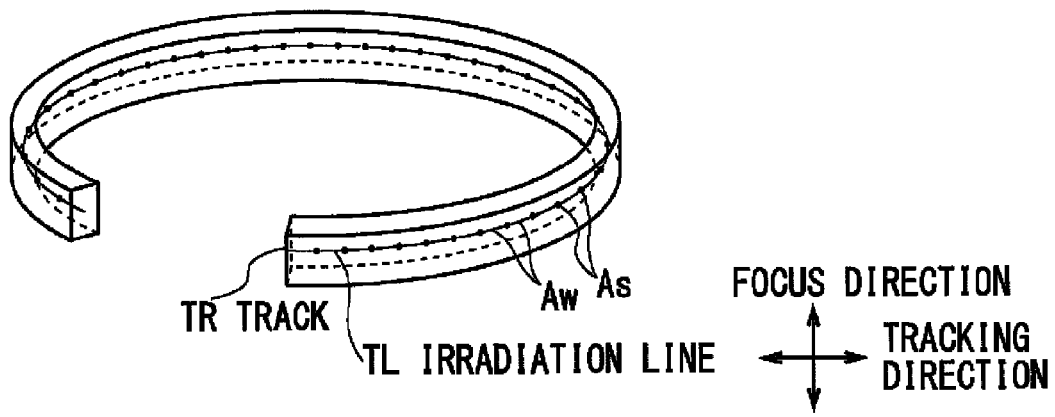
FIG. 6 is a schematic sectional view showing the layout of servo mark areas.

Servo information lines KL as many as 1400 are formed in a radial pattern as shown in FIG. 5A so that they are arranged at almost the same spacing in angle between each other. As shown in FIG. 6, each mark recording layer Y has the same number of servo information lines KL in the respective same positions.

That is, the servo information marks KS are scattered over each track TR of each mark recording layer Y at intervals corresponding to the radial position of the optical disc 100. Each servo information mark KS is located near the center of the track TR in the radial direction of the optical disc 100, or tracking direction, and near the center of the track TR in the thickness direction of the optical disc 100, or focus direction (i.e., the center of the mark recording layer Y).

In other words, as shown in FIG. 6, servo mark areas As having servo information marks KS and recording areas Aw having recording marks RM are formed alternately along an irradiation line TL to be irradiated with the light beam LB. The track TR is formed with the irradiation line TL in the center.

As shown in FIG. 5B, the servo information marks KS formed in a servo mark area As include: tracking servo marks KSt for controlling the light beam LB in the tracking direction; a focusing mark KSf for controlling the light beam LB in the focus direction; and address information marks KSa for indicating the address of the servo mark area As.

The tracking marks KSt are intended to produce a tracking error signal STE which indicates the amount of deviation of the light beam LB from the tracking marks KSt based on the reflected light beam LBR. The tracking marks KSt are also used to determine the position of the focal point FI of the light beam LB in the tracking direction of the light beam LB so that the focus error signal STE becomes zero.

The focusing mark KSf is intended to produce a focus error signal SFE which indicates the amount of deviation of the light beam LB from the focusing mark KSf based on the reflected light beam LBR. The focusing mark KSf is also used to determine the position of the focal point FI of the light beam LB in the thickness direction (i.e., focus direction) of the light beam LB so that the focus error signal SFE becomes zero. Note that the focusing mark KSf has a length of, e.g., about five times that of a tracking mark KSt, so as to increase the amount of the reflected light beam LBR.

Consequently, the tracking marks KSt and the focusing mark KSf make it possible to adjust the light beam LB in the tracking direction and focus direction so that the focal point FI of the light beam LB falls on the irradiation line TL.

Figure 7:
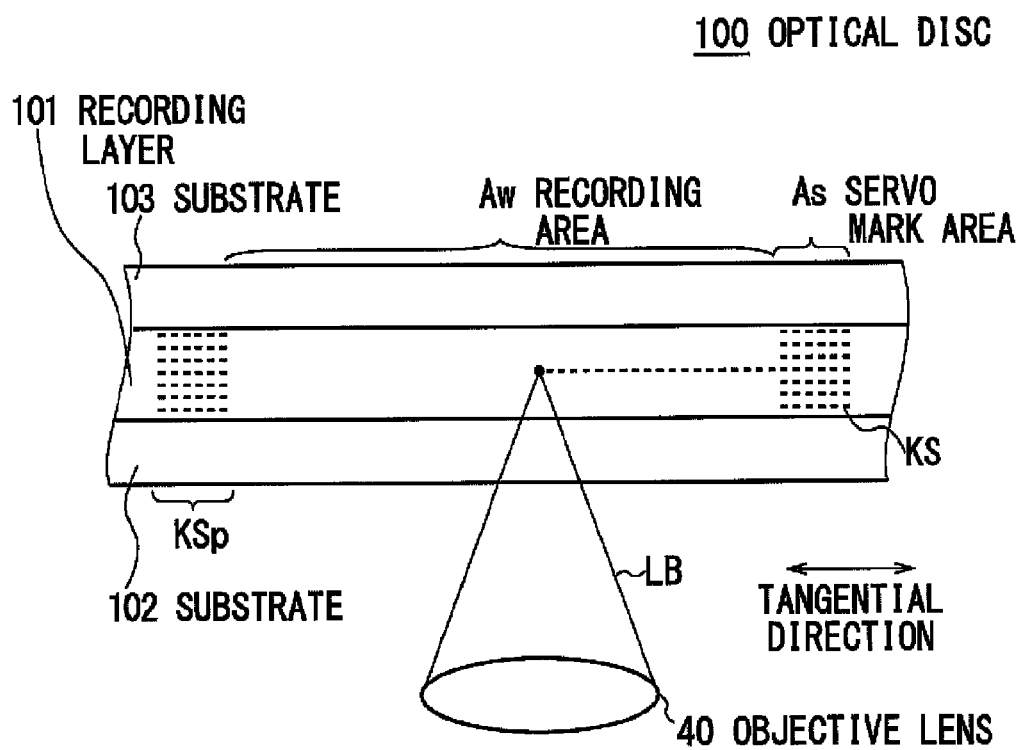
FIG. 7 is a schematic diagram for explaining the recording of information.

As shown in FIG. 7, an objective lens 40 is displaced so that a position of the recording layer 101 determined by the servo information marks KS is irradiated with the light beam LB. The objective lens 40 is then fixed to that lens position while recording marks RM are formed up to the next servo information marks KS. In this way, recording marks RM can be formed in the recording area Aw of the recording layer 101.

The recording layer 101 is configured so that when reproducing information that is recorded on the recording layer 101, servo control is performed based on the recording marks RM that are recorded on the recording layer 101.

The servo mark areas As are formed inside the recording layer 101. When the optical disc 100 suffers distortion, wobbling, or the like, for example, the servo mark areas As therefore also change in position according to the distortion, wobbling, or the like.

In other words, the servo mark areas As are formed in the tracks TR for recording marks RM to be formed on, adjoining the recording areas Aw where the recording marks RM are formed. The servo mark areas As for reference are thus very close to the recording areas Aw. This can improve the position accuracy of irradiation of the light beam LB significantly as compared to hitherto optical discs where target mark positions are determined with reference to a distant reference surface.

Since the position of a track TR is determined based on the presence of servo information marks KS, there is no possibility that the position of the track TR is misidentified because of such factors as a tilt of the optical disc 100 depending on how the optical disc 100 is loaded. Consequently, the optical disc 100 makes it possible to focus the light beam LB on a target track TRG with reliability, for example, even when the optical disc 100 is reloaded.

As described above, when recording information on the optical disc 100, the lens position of the objective lens 40 is determined based on the reflected light beam LBR that is reflected by the servo information marks KS, and recording marks RM are formed with the objective lens 40 fixed to that lens position.

Figure 1A:
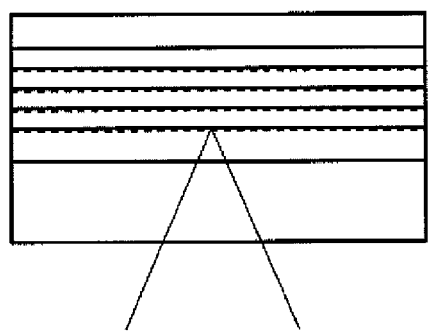
FIGS. 1A and 1B are schematic sectional views showing the configuration of a recording layer of a hitherto known optical disc.
Figure 1B:
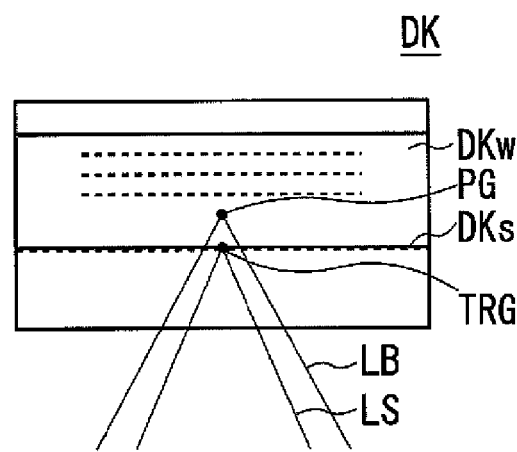

Consequently, the optical disc 100 makes it possible to perform position control on the focal point FI (i.e., servo control on the objective lens 40) by using the servo information marks KS formed in the optical disc 100. A target mark position PG in the recording layer 101 can thus be irradiated with the light beam LB without the optical disc 100 having a reflecting layer DKs (FIG. 1B).

(1-2) Principle of Initialization Processing

As described above, the optical disc 100 has no reflecting layer, nor any guideline to the recording layer 101. According to the first embodiment of the present invention, the optical disc 100 having no servo information mark KS yet (hereinafter, referred to as an uninitialized optical disc 100X) is subjected to initialization processing of temporarily fixing an initialization reference plate SD having a reference part SDs thereto and recording servo information marks KS.

Figure 8A:
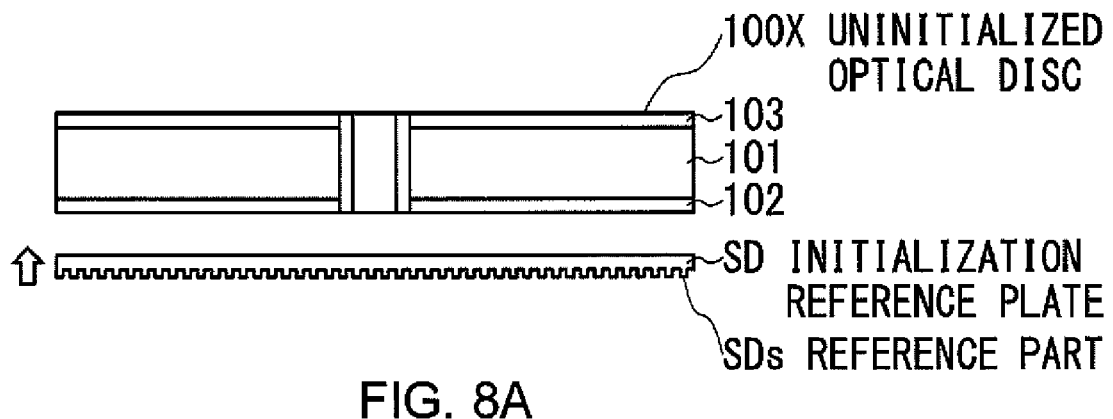
FIGS. 8A to 8C are schematic diagrams for explaining the principle of recording of servo information marks.

More specifically, as shown in FIG. 8A, the initialization reference plate SD is aligned and fixed to the uninitialized optical disc 100X to manufacture an integrated disc 100G.

Figure 8B:
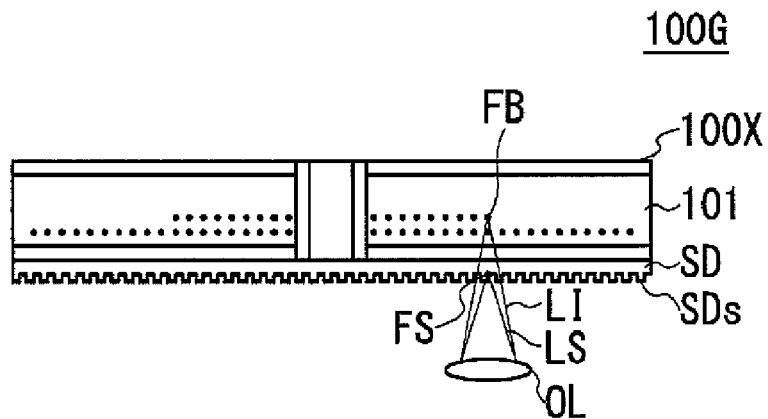
Figure 8C:
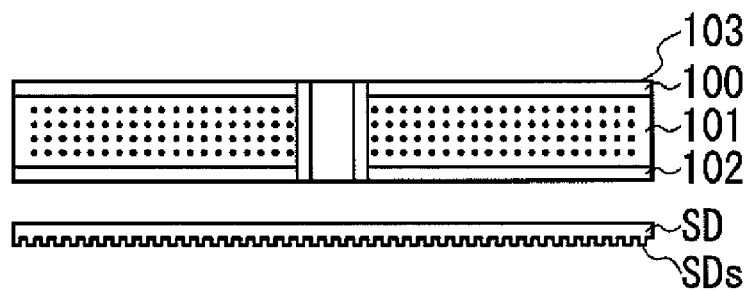

Subsequently, as shown in FIG. 8B, the focal point FI of an information light beam LI is displaced with reference to the focal point FS of a servo light beam LS which is focused on the reference part SDs. Servo information marks KS are thereby formed in the recording layer 101 of the uninitialized optical disc 100X, at target positions SG where to form the servo information marks KS.

When the recording of the servo information marks KS on the recording layer 101 is completed, the initialization reference plate SD is removed from the integrated disc 100G. This can provide the optical disc 100 that has the servo information marks KS recorded thereon.

(1-3) Configuration of Initialization Reference Plate

Next, the configuration of an initialization reference plate 200 will be described.

As shown in the external view of FIG. 9A, the initialization reference plate 200 is formed in a disc shape with a diameter of approximately 140 mm, i.e., 20 mm greater than that of the optical disc 100 (FIG. 2) as a whole. Unlike the optical disc 100, no hole part is formed in the center.

As shown in FIGS. 10A and 10B, the initialization reference plate 200 is provided with a center area 200C, a servo area 200S, and a fringe area 200D from the center to the periphery. The center area 200C, the servo area 200S, and the fringe area 200D of the initialization reference plate 200 are formed with outside diameters of approximately 46 mm, approximately 117 mm, and approximately 140 mm, respectively.

As shown in the cross-sectional view of FIG. 9B, the initialization reference plate 200 is formed by laminating substrates 202 and 203. The substrates 202 and 203 have thicknesses t2 and t3 of approximately 0.4 mm each.

The substrates 202 and 203 are made of material such as polycarbonate and glass, and both transmits light incident on one side to the other side with high transmittance. The substrates 202 and 203 have some strength to play the role of protecting a reference part 201 to be described later. The surfaces of the substrates 202 and 203 may be anti-reflection coated so as to avoid unnecessary reflection.

The reference part 201 is formed at the interface between the substrates 202 and 203, over an area corresponding to the servo area 200S.

The reference part 201 is made of a dielectric multilayer film or the like. The reference part 201 transmits the information light beam LI of blue laser light with a wavelength of 405 nm and reflects the servo light beam LS of red laser light with a wavelength of 660 nm.

The reference part 201 has a guide groove intended for tracking servo. Specifically, the reference part 201 has spiral servo tracks of the same land-and-groove configuration as with a typical BD recordable (BD-R) disc or the like. A series of numbers or addresses are assigned to the servo tracks in units of predetermined recording units so that which servo track to record or reproduce information on/from can be identified from the addresses.

It should be appreciated that the reference part 201 (i.e., the interface between the substrate 202 and the substrate 203) may alternatively be provided with pits or the like instead of the guide groove. The guide groove may be combined with pits or the like.

In the initialization reference plate 200, the reference part 201 is formed only in the servo area 200S which ranges from approximately 46 mm to approximately 117 mm in diameter, corresponding to the recording area 100W of the optical disc 100. Note that the initialization reference plate 200 has three alignment holes 200E of the order of approximately 1 mm on a circle of approximately 40 mm in diameter as with the optical disc 100, at almost regular intervals as with the optical disc 100 (details will be given later).

(1-4) Manufacturing of Integrated Disc

In the present embodiment, the integrated disc 100G is formed by bonding the optical disc 100 and the initialization reference plate 200 with adhesive sheets.

Specifically, as shown in FIGS. 11A and 11B, adhesive sheets 210 (210A and 210B) are initially attached to the center area 200C and the fringe area 200D of the initialization reference plate 200 at the side of the substrate 203. The adhesive sheets 210 are two-sided adhesive sheets of low-tack type which are made of, e.g., a polyethylene terephthalate (PET) resin film with an adhesive applied to both sides.

The adhesive sheet 210A has a hollow-centered doughnut shape, with an outside diameter of approximately 138 mm which is slightly smaller than that of the fringe area 200D and an inside diameter of approximately 118 mm which is slightly greater than that of the fringe area 200D. The adhesive sheet 210A can thus be attached so as not to protrude from the fringe area 200D.

The adhesive sheet 210B has a disc shape with an outside diameter of approximately 30 mm. The adhesive sheet 210B is then attached to only within the positions of the alignment holes 200E which are formed in the center area 200C, so as not to block the alignment holes 200E.

Figure 12:
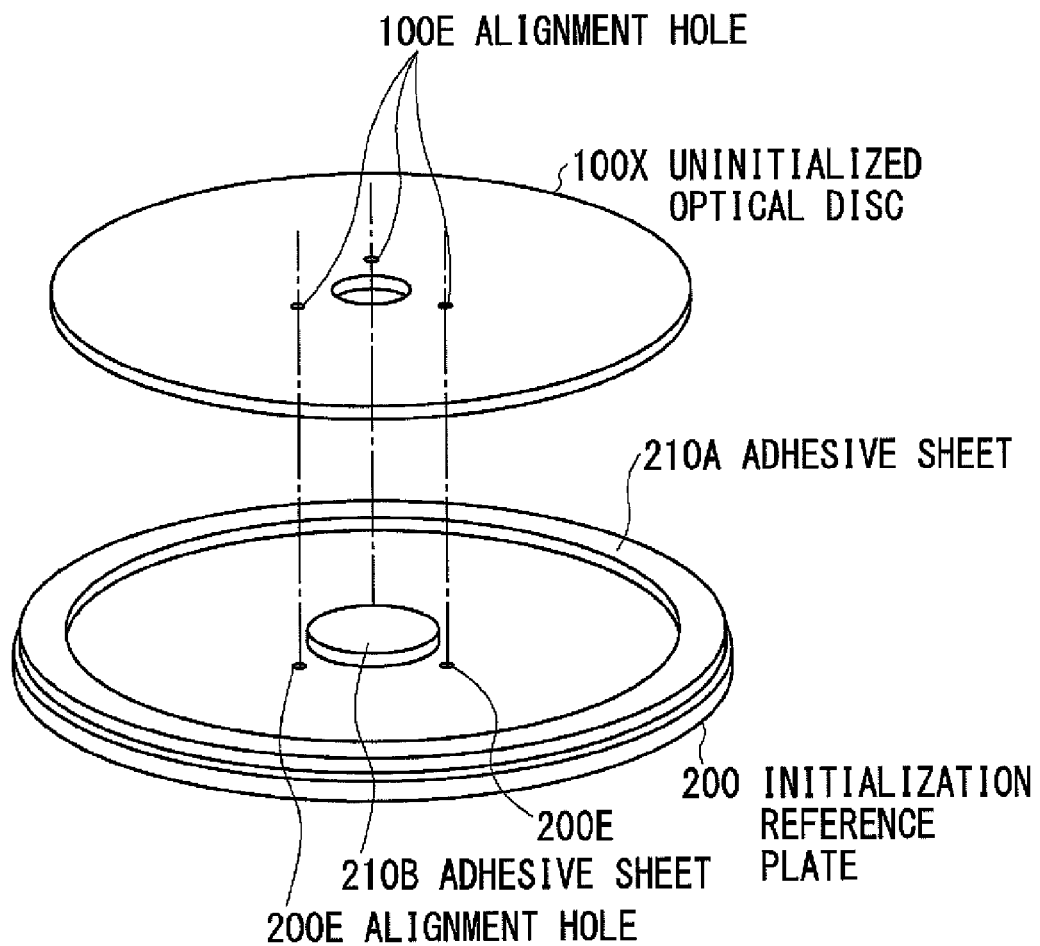
FIG. 12 is a schematic diagram for explaining the bonding of the optical disc and the initialization reference plate.

As shown in FIG. 12, three alignment pins of an alignment tool (not shown) corresponding to the alignment holes 100E and 200E are passed through the alignment holes 200E of the initialization reference plate 200, with the substrate 203 having the adhesive sheets 210 upward. The alignment pins are then passed through the alignment holes 100E of the uninitialized optical disc 100X.

Here, the alignment holes 200E of the initialization reference plate 200 and the alignment holes 100E of the uninitialized optical disc 100X are formed at almost the same intervals on the circles of 40 mm in diameter on the initialization reference plate 200 and the uninitialized optical disc 100X, and are located in almost the same positions.

The uninitialized optical disc 100X can thus be placed so that its center point 100M coincides with the center point 200M of the initialization reference plate 200. This makes it possible to stack the recording area 100W and the servo area 200S with high accuracy easily.

Figure 13:
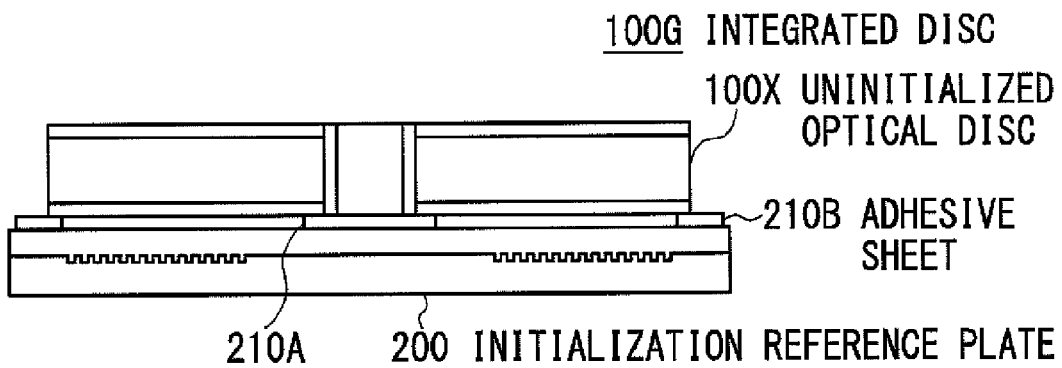
FIG. 13 is a schematic diagram showing the configuration of an integrated disc.

With the alignment pins passed through the alignment holes 100E, the uninitialized optical disc 100X is put into close contact with the adhesive sheets 210 which are attached onto the initialization reference plate 200. Under pressure, the uninitialized optical disc 100X is then fixed to the initialization reference plate 200 as shown in FIG. 13. Hereinafter, the uninitialized optical disc 100X and the initialization reference plate 200 fixed to each other will be referred to as an integrated disc 100G. The integrated disc 100G is then detached from the alignment pins.

Figure 14:
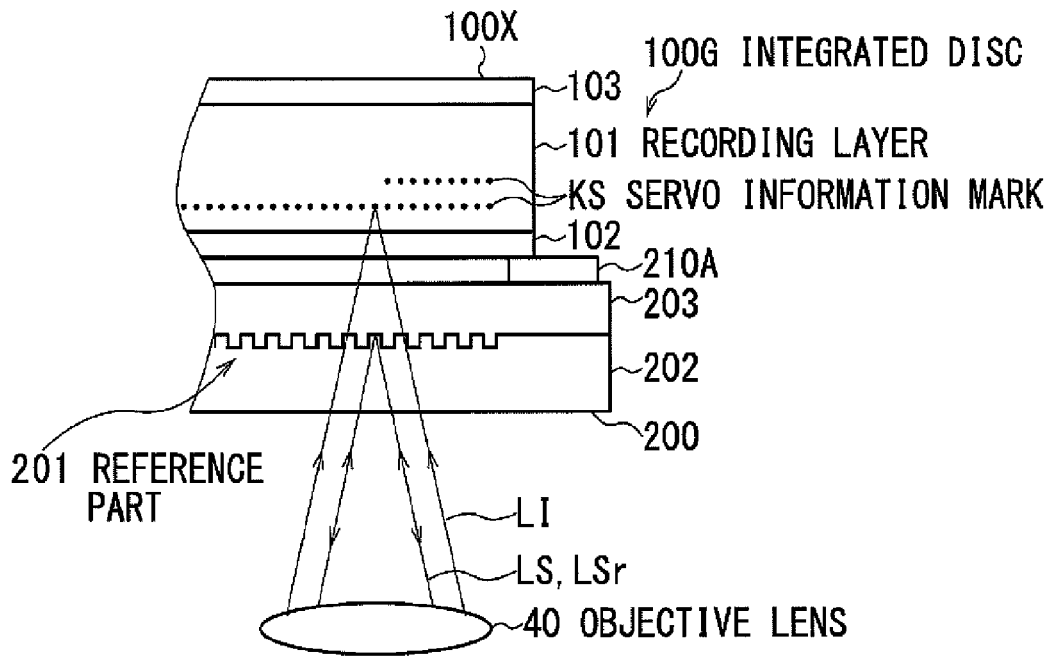
FIG. 14 is a schematic diagram for explaining the irradiation of the integrated disc with light beams according to the first embodiment.

As shown in FIG. 14, when the integrated disc 100G is irradiated with the servo light beam LS from the side of the substrate 202 of the initialization reference plate 200, the servo light beam LS is reflected toward the substrate 202 by the reference part 201. Hereinafter, the light beam reflected will be referred to as a servo reflected light beam LSr.

The servo reflected light beam LSr is intended for use in an initialization apparatus 1 (to be detailed later) to perform position control on an objective lens 40 for collecting the servo light beam LS (i.e., focus control and tracking control) so that the focal point FS of the servo light beam LS is adjusted to an intended servo track (hereinafter, referred to as a desired servo track) on the reference part 201.

In fact, when recording a servo information mark KS on the recording layer 101 of the integrated disc 100G, the servo light beam LS is collected by the position-controlled objective lens 40 so as to focus on a desired servo track of the reference part 201.

The integrated disc 100G is configured so that the focal point FI of the information light beam LI passed through the same objective lens 40 focuses on a position at a target depth on the "front side" of the desired servo track in the recording layer 101 (hereinafter, this position will be referred to as a target position SG).

As described above, when recording a servo information mark KS on the optical disc 100, the servo light beam LS intended for position control and the information light beam LI intended for information recording are used to form the servo information mark in the position where the recording layer 101 is irradiated with the focal point FI, i.e., in the target position SG at the target depth on the front side of the desired servo track of the reference part 201.

(1-5) Configuration of Initialization Apparatus

Next, description will be given of the initialization apparatus 1 which records servo information marks KS on the integrated disc 100G described above.

Figure 15:
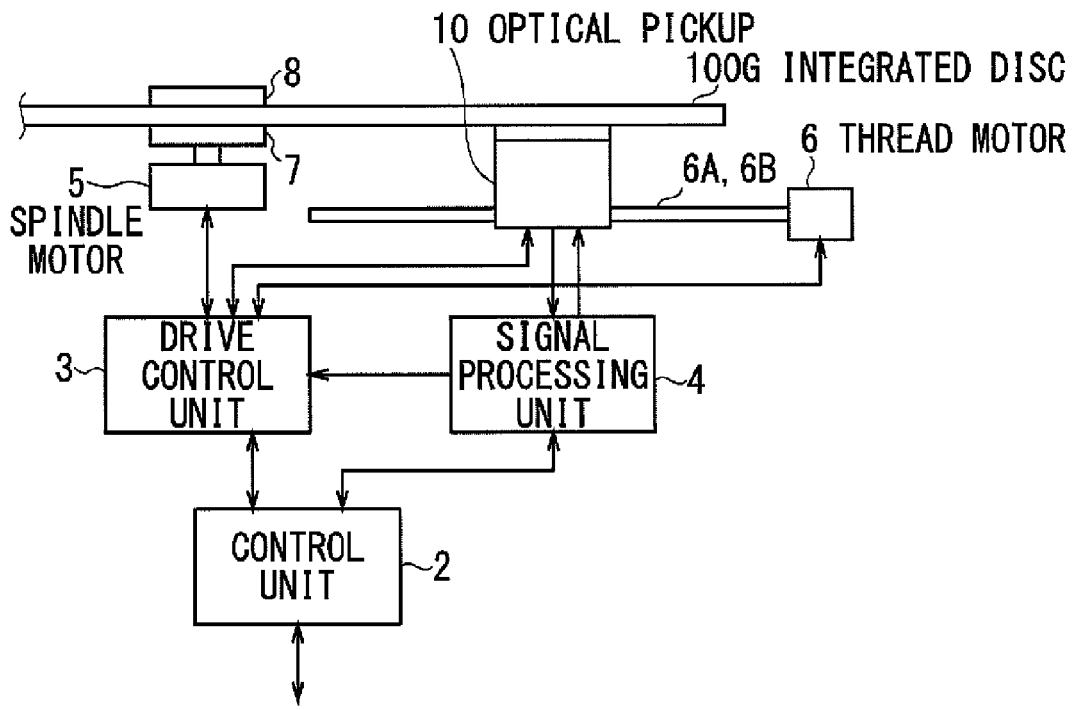
FIG. 15 is a schematic diagram showing the configuration of an initialization apparatus.

As shown in FIG. 15, the initialization apparatus 1 sandwiches and fixes the integrated disc 100G between press members 7 and 8, whereby the initialization apparatus 1 is loaded with the integrated disc 100G.

Figure 16:
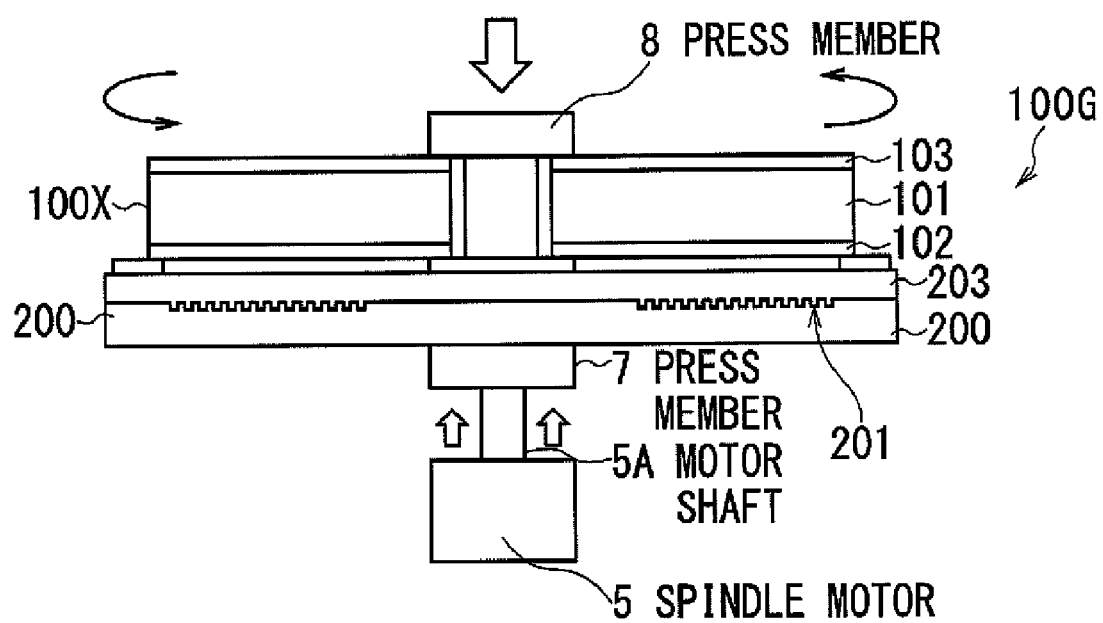
FIG. 16 is a schematic diagram for explaining the loading of the integrated disc.

As shown in FIG. 16, the press member 7 is attached to the end of a motor shaft 5A of a spindle motor 5, and is pressed against the center area 200C of the initialization reference plate 200. The press member 8 is arranged in a rotatable manner and pressed against the center area 100C of the uninitialized optical disc 100X.

In the initialization apparatus 1, the press member 7 is rotated by the rotational output of the motor shaft 5A resulting from the driving of the spindle motor 5. This can transmit the rotating force to the integrated disc 100G and the press member 8, whereby the integrated disc 100G is rotated.

In the initialization apparatus 1, a control unit 2 (FIG. 15) exercises centralized control on the entire apparatus. The control unit 2 is composed mainly of a not-shown central processing unit (CPU). The control unit 2 reads various types of programs such as a basic program and an information recording program from a not-shown read only memory (ROM), loads the programs into a not-shown random access memory (RAM), and thereby executes various types of processing such as servo information recording processing.

For example, when the control unit 2 accepts a servo information recording command from a not-shown operation unit with the integrated disc 100G loaded, the control unit 2 generates recording address information and a drive command and supplies them to a drive control unit 3. The control unit 2 also generates servo recording information based on the recording address information, and supplies the servo recording information to a signal processing unit 4.

The recording address information is information for indicating addresses for servo information marks KS to be recorded at. As described above, servo information marks KS can be formed in the servo mark areas As alone out of the servo mark areas As and the recording areas Aw of the recording layer 101. The control unit 2 therefore supplies discrete recording address information for designating such servo mark areas As.

According to the drive command, the drive control unit 3 performs drive control on the spindle motor 5, thereby rotating the integrated disc 100G at an arbitrary rotation speed. The drive control unit 3 also performs drive control on a thread motor 6, thereby moving an optical pickup 10 to a position corresponding to the recording address information in a radial direction of the optical disc 100 (i.e., radially inward or radially outward) along moving shafts 6A and 6B.

The signal processing unit 4 applies various types of signal processing such as predetermined encoding processing and modulation processing to the servo recording information supplied, thereby generating a recording signal. The signal processing unit 4 supplies the recording signal to the optical pickup 10.

The optical pickup 10 performs focus control and tracking control based on the control of the drive control unit 3. The optical pickup 10 thereby focuses the light beam on a track TR that is designated by the recording address information in the recording layer 101 (i.e., target position SG), and records recording marks RM according to the recording signal from the signal processing unit 4 (details will be given later).

In this way, the initialization apparatus 1 controls the optical pickup 10 through the control unit 2, thereby recording servo recording information as servo information marks KS at the target position SG of the recording mark 101.

The integrated disc 100G is then ejected from the initialization apparatus 1, and the initialization reference plate 200 and the adhesive sheets 210 are removed from the optical disc 100 that is provided with the servo information marks KS (i.e., initialized).

As described above, the initialization apparatus 1 is loaded with the integrated disc 100G that is formed by bonding the initialization reference plate 200 to the uninitialized optical disc 100X, and performs focus control and tracking control on the integrated disc 100G while forming servo information marks KS on the recording layer 101.

(1-6) Configuration of Optical Pickup

Figure 17:
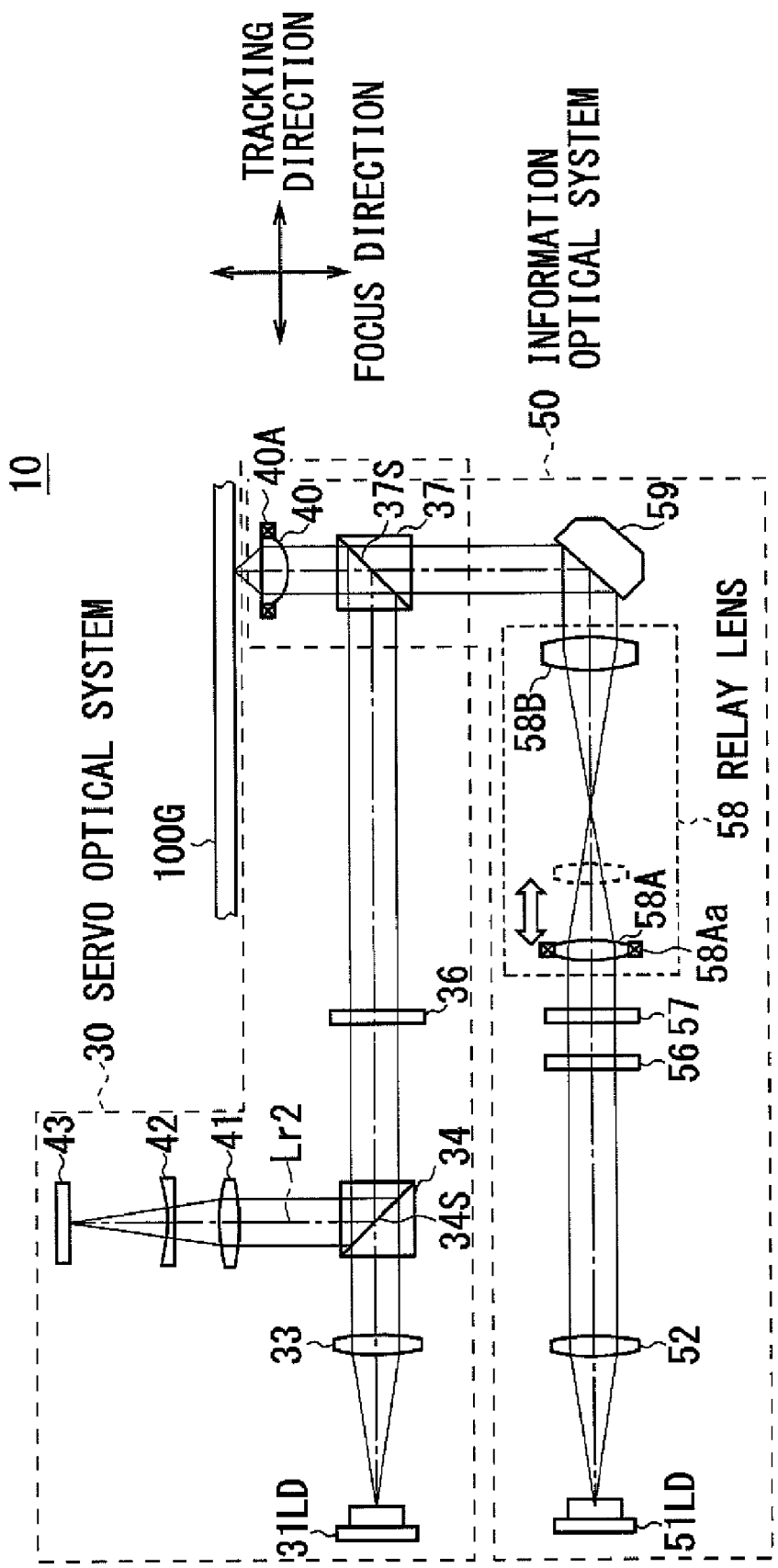
FIG. 17 is a schematic diagram showing the configuration of an optical pickup.

Next, description will be given of the configuration of the optical pickup 10 in the initialization apparatus 1. As shown in FIG. 17, the optical pickup 10 includes a servo optical system 30 which is intended for servo control, and an information optical system 50 which is intended to form servo information marks KS.

In the optical pickup 10, a servo light beam LS, which is servo light emitted from a laser diode 31, and an information light beam LI, which is information light emitted from a laser diode 51, are both incident on the same objective lens 40 through the servo optical system 30 and the information optical system 50, respectively. The integrated disc 100G is irradiated with the resulting light beams.

(1-6-1) Optical Path of Servo Light Beam

Figure 18:
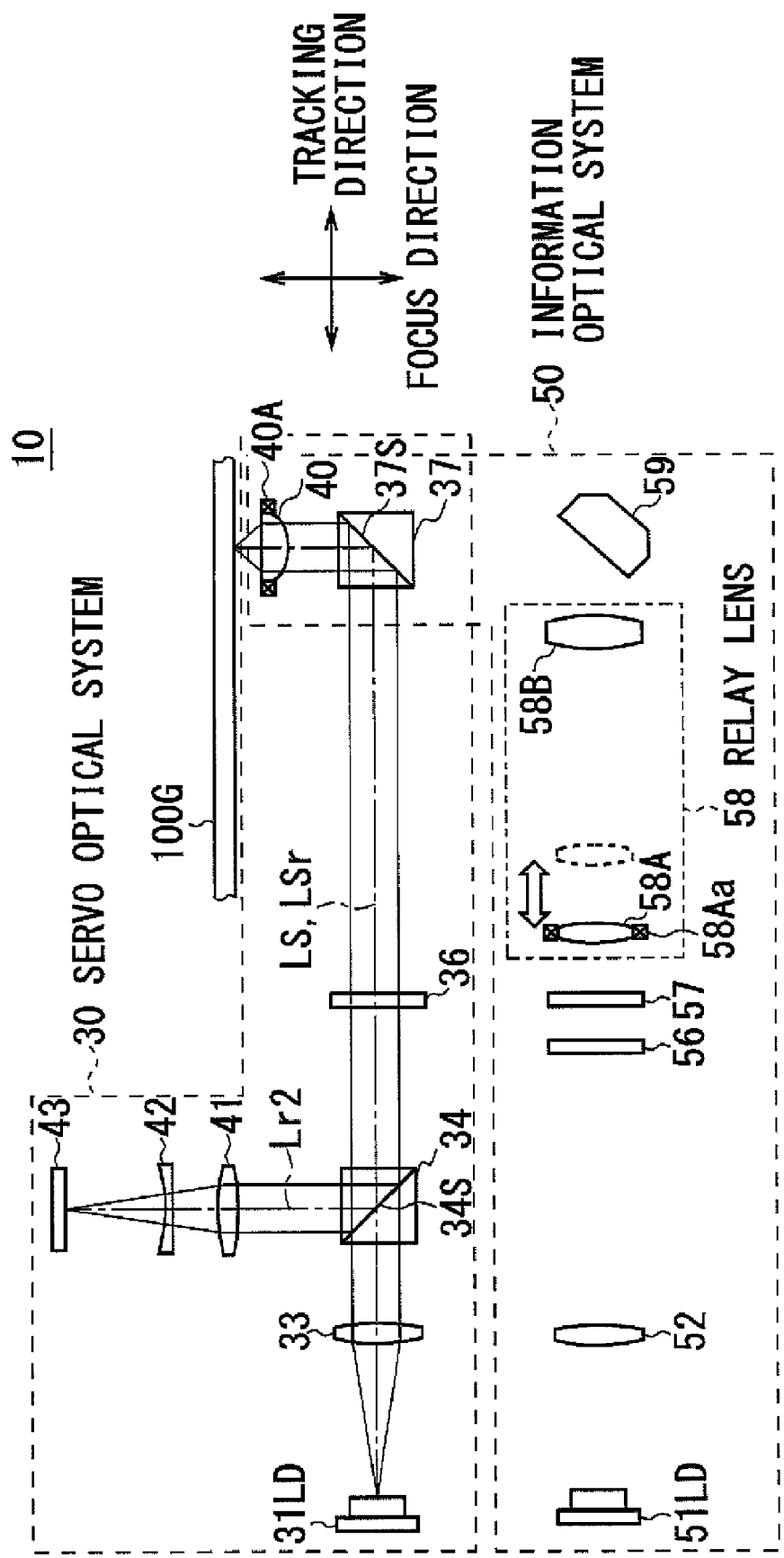
FIG. 18 is a schematic diagram for explaining the optical path of a servo light beam.

As shown in FIG. 18, the servo optical system 30 irradiates the integrated disc 100G with the servo light beam LS through the objective lens 40, and receives the servo reflected light beam LSr reflected from the integrated disc 100G with a photodetector 43.

More specifically, the laser diode 31 emits P-polarized red laser light of approximately 660 nm in wavelength. In fact, the laser diode 31 emits a predetermined amount of servo light beam LS of divergent light based on the control of the control unit 2 (FIG. 15) so that the servo light beam LS is incident on a collimator lens 33. The collimator lens 33 converts the servo light beam LS of divergent light into parallel light, and makes it incident on a polarizing beam splitter 34.

The polarizing beam splitter 34 reflects or transmits a light beam at/through its reflecting/transmitting surface 34S in different ratios depending on the direction of polarization of the light beam. The reflecting/transmitting surface 34S transmits almost all of a P-polarized light beam and reflects almost all of an S-polarized light beam.

The polarizing beam splitter 34 then transmits almost all of the P-polarized servo light beam LS so that it is incident on a quarter-wave plate 36.

The quarter-wave plate 36 converts the servo light beam LS of P polarization into left-handed circular polarization, for example, and makes it incident on a dichroic prism 37. The dichroic prism 37 reflects or transmits a light beam at/through its transmitting/reflecting surface 37S depending on the wavelength of the light beam. The dichroic prism 37 thus reflects the servo light beam LS so that it is incident on the objective lens 40.

The objective lens 40 collects the servo light beam LS and projects it toward the reference part 201 of the integrated disc 100G. As shown in FIG. 14, the servo light beam LS is transmitted through the substrate 102 and is reflected from the reference part 201 to travel in the direction opposite to the servo light beam LS. This produces the servo reflected light beam LSr which has the direction of polarization reverse to that of the servo light beam LS.

Subsequently, the servo reflected light beam LSr is converted into parallel light through the objective lens 40 and is then incident on the dichroic prism 37. The dichroic prism 37 reflects the servo reflected light beam LSr so that it is incident on the quarter-wave plate 36.

The quarter-wave plate 36 converts the servo reflected light beam LSr of right-handed circular polarization into S polarization, and makes it incident on the polarizing beam splitter 34. The polarizing beam splitter 34 reflects the S-polarized servo reflected light beam LSr according to the direction of polarization, so that the servo reflected light beam LSr is incident on a multi-lens 41.

The multi-lens 41 converges the servo reflected light beam LSr. A cylindrical lens 42 provides the servo reflected light beam LSr with an astigmatic aberration and irradiates the photodetector 43 with the resultant.

Since the initialization apparatus 1 can cause wobbling and the like to the rotating integrated disc 100G, there is a possibility that the desired servo track changes in relative position with respect to the objective lens 40.

In order to make the focal point FS (FIG. 14) of the servo light beam LS follow the desired servo track, it is therefore necessary to move the focal point FS in focus directions and radial directions of the integrated disc 100G. The focus directions refer to the directions toward and away from the integrated disc 100G. The radial directions refer to the directions radially inward and radially outward of the integrated disc 100G.

The objective lens 40 can be driven biaxially in the focus directions and radial directions by a biaxial actuator 40A.

In the servo optical system 30 (FIG. 18), various optical components are adjusted in optical position so that the state of focusing when the reference part 201 of the integrated disc 100G is irradiated with the servo light beam LS that is collected through the objective lens 40 is reflected upon the state of focusing when the photodetector 43 is irradiated with the servo reflected light beam LSr that is collected through the multi-lens 41.

Figure 19:
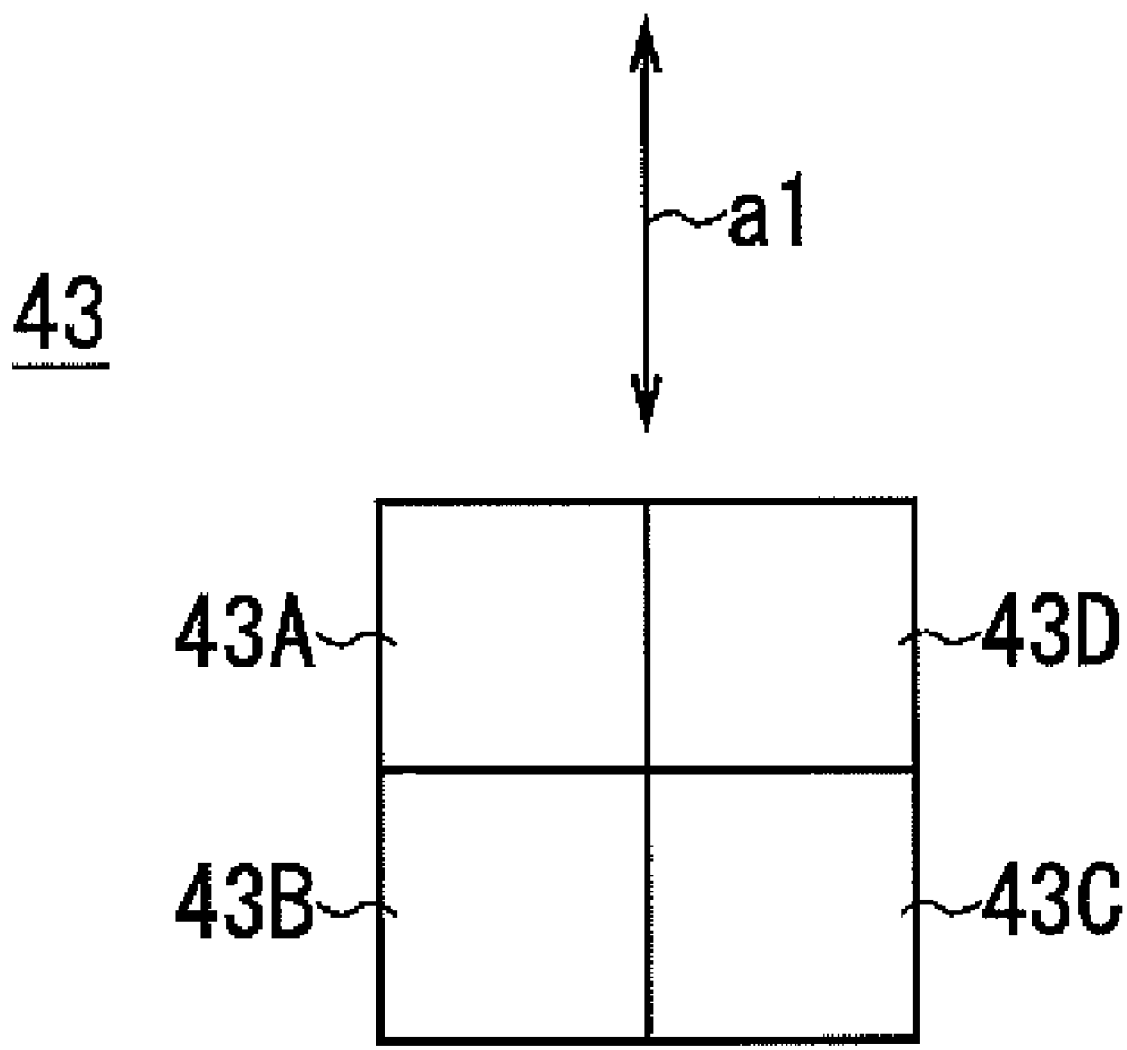
FIG. 19 is a schematic diagram showing the configuration of detection areas of a photodetector.

As shown in FIG. 19, the photodetector 43 has four detection areas 43A, 43B, 43C and 43D which are divided in a lattice pattern on the surface to be irradiated with the servo reflected light beam LSr. Note that the directions shown by the arrow a1 (vertical directions in the diagram) correspond to the running direction of the servo track when the reference part 201 (FIG. 14) is irradiated with the servo light beam LS.

The photodetector 43 detects parts of the servo reflected light beam LSr from the respective detection areas 43A, 43B, 43C, and 43D. According to the amounts of light detected here, the photodetector 43 generates respective detection signals SDAs, SDBs, SDCs, and SDDs, and transmits these signals to the signal processing unit 4 (FIG. 15).

The signal processing unit 4 performs focus control by a so-called astigmatic aberration method. The signal processing unit 4 calculates a focus error signal SFEs according to the following equation (1), and supplies the signal to the drive control unit 3:

$$SFEs=(SDAs+SDCs)-(SDBs+SDDs) \quad (1)$$

The focus error signal SFEs indicates the amount of deviation between the focal point FS of the servo light beam LS and the reference part 201 of the integrated disc 100G.

The signal processing unit 4 also performs tracking control by a so-called push pull method. The signal processing unit 4 calculates a tracking error signal STEs according to the following equation (2), and supplies the signal to the drive control unit 3:

$$STEs=(SDAs+SDDs)-(SDBs+SDCs) \quad (2)$$

The tracking error signal STEs indicates the amount of deviation between the focal point FS and the desired servo track in the reference part 201 of the integrated disc 100G.

The drive control unit 3 generates a focus drive signal SFDs based on the focus error signal SFEs, and supplies the focus drive signal SFDs to the biaxial actuator 40A. The drive control unit 3 thereby performs feedback control (i.e., focus control) on the objective lens 40 so that the servo light beam LS focuses on the reference part 201 of the integrated disc 100G.

The drive control unit 3 also generates a tracking drive signal STDs based on the tracking error signal STEs, and supplies the tracking drive signal STDs to the biaxial actuator 40A. The drive control unit 3 thereby performs feedback control (i.e., tracking control) on the objective lens 40 so that the servo light beam LS focuses on the desired servo track in the reference part 201 of the integrated disc 100G.

As described above, the servo optical system 30 irradiates the reference part 201 of the integrated disc 100G with the servo light beam LS, and supplies the result of reception of the reflected light, or servo reflected light beam LSr, to the signal processing unit 4. The drive control unit 3 performs focus control and tracking control on the objective lens 40 accordingly so that the servo light beam LS focuses on the desired servo track of the reference part 201.

(1-6-2) Optical Path of Information Light Beam

Figure 20:
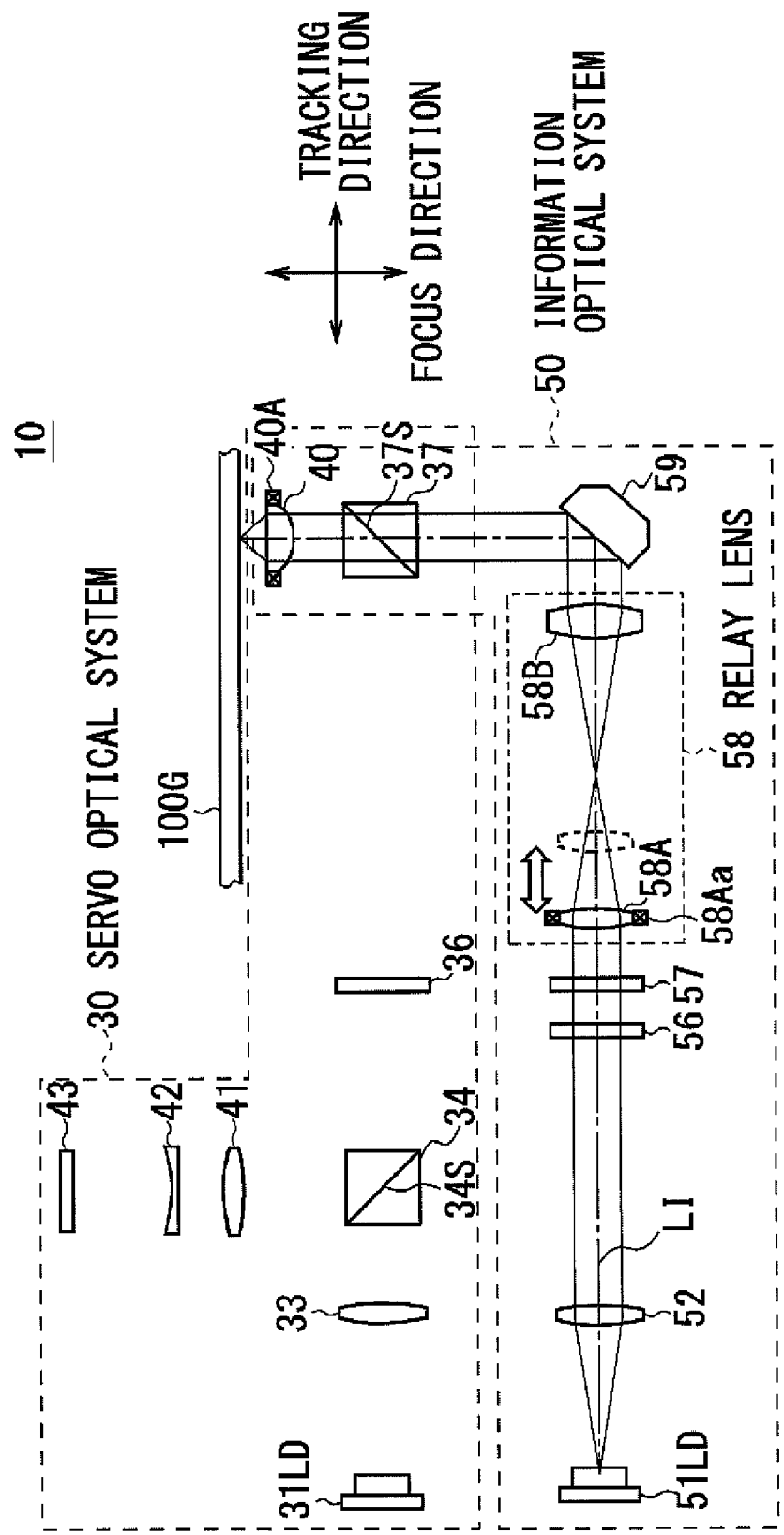
FIG. 20 is a schematic diagram for explaining the optical path of an information light beam.

In the meantime, as shown in FIG. 20 which corresponds to FIG. 17, the information optical system 50 irradiates the integrated disc 100G with the information light beam LI emitted from the laser diode 51 through the objective lens 40.

More specifically, the laser diode 51 emits blue laser light of approximately 405 nm in wavelength. In fact, the laser diode 51 emits a predetermined amount of information light beam LI of divergent light based on the control of the control unit 2 (FIG. 15) so that the information light beam LI is incident on a collimator lens 52.

The collimator lens 52 converts the information light beam LI of divergent light into parallel light, and makes it incident on a quarter-wave plate 57 through a liquid crystal panel (LCP) 56 which corrects spherical aberration and the like.

The quarter-wave plate 57 converts the information light beam LI of P polarization into left-handed circular polarization, for example, and makes it incident on a relay lens 58.

The relay lens 58 converts the information light beam LI of parallel light into convergent light through a movable lens 58A. The information light beam LI converges and then becomes divergent light, and the relay lens 58 adjusts the degree of convergence or divergence (hereinafter, referred to as the state of convergence) of the information light beam LI with a fixed lens 58B and makes it incident on a mirror 59.

Here, the movable lens 58A is moved in the direction of the optical axis of the information light beam LI by an actuator 58Aa. In fact, the relay lens 58 can change the state of convergence of the information light beam LI to be emitted from the fixed lens 58B by moving the movable lens 58A with the actuator 58Aa based on the control of the control unit 3 (FIG. 15).

The mirror 59 reflects the information light beam LI, thereby reversing the direction of polarization of the circularly-polarized information light beam LI (for example, from left-handed circular polarization to right-handed circular polarization) and deflecting the traveling direction so that the information light beam LI is incident on the dichroic prism 37. The dichroic prism 37 transmits the information light beam LI through the reflecting/transmitting surface 37S so that it is incident on the objective lens 40.

The objective lens 40 collects the information light beam LI and irradiates the integrated disc 100G with the same. As shown in FIG. 14, the information light beam LI is transmitted through the initialization reference plate 200 and incident on the uninitialized optical disc 100X. The information light beam LI is then transmitted through the substrate 102 of the uninitialized optical disc 100X and comes into focus inside the recording layer 101.

The position of the focal point FI of the information light beam LI is determined by the state of convergence when emitted from the fixed lens 58B of the relay lens 58. That is, the focal point FI moves inside the recording layer 101 in the focus directions according to the position of the movable lens 58A.

In fact, the drive control unit 3 (FIG. 15) controls the position of the movable lens 58A, whereby the information optical system 50 adjusts the depth d of the focal point FI (FIG. 14) of the information light beam LI in the recording layer 101 of the integrated disc 100G (i.e., the distance from the reference part 201) so that the focal point FI coincides with the target position SG.

The information light beam LI is then collected to the focal point FI through the objective lens 40, and forms a servo information mark RM in the vicinity of the focal point FI.

Note that the objective lens 40 is optimized and designed to the integrated disc 100G, with consideration given to the spherical aberration that occurs in the integrated disc 100G.

As described above, the information optical system 50 projects the information light beam LI through the optical lens 40 which is servo-controlled by the servo optical system 30, so that the focal point FI of the information light beam LI coincides with the target position SG in the tracking direction. The depth d of the focal point FI from the reference part 201 is also adjusted according to the position of the movable lens 58A of the relay lens 58 so that the focal point FI coincides with the target position SG in the focus direction.

(1-7) Procedure of Initialization Processing

Figure 21:
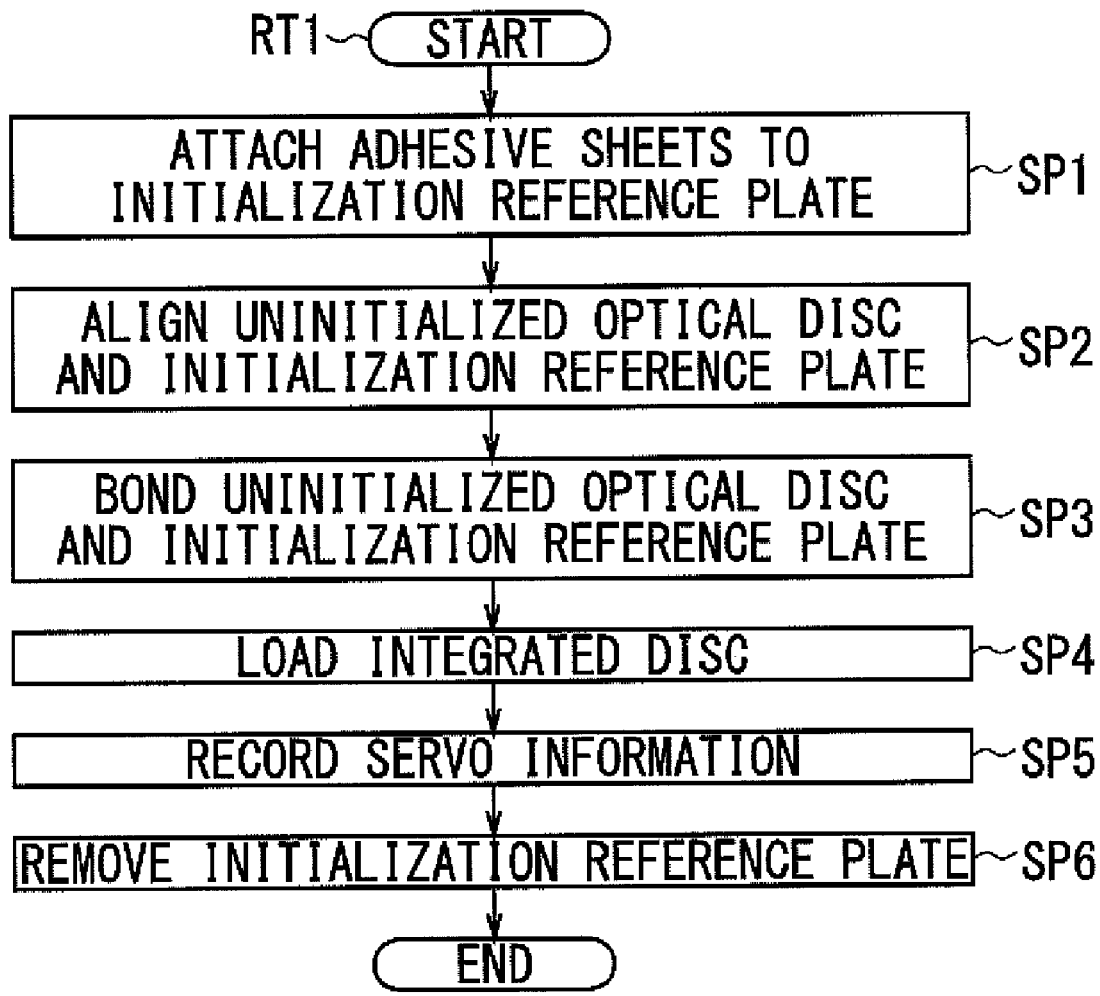
FIG. 21 is a flowchart for explaining the procedure of initialization processing according to the first embodiment.

Next, the procedure of initialization processing for forming servo information marks KS in the optical disc 100 will be described with reference to the flowchart shown in FIG. 21.

The initialization processing is started at the start step. Proceeding to step SP1, the adhesive sheets 210 are attached to the initialization reference plate 200. The procedure then proceeds to the next step SP2.

At step SP2, the uninitialized optical disc 100X and the initialization reference plate 200 are aligned to each other, for example, by using a predetermined jig. The procedure then proceeds to the next step SP3.

At step SP3, the uninitialized optical disc 100X and the initialization reference plate 200 are put into close contact and bonded to each other via the adhesive sheets 210, whereby the integrated disc 100G is manufactured. The procedure then proceeds to the next step SP4.

At step SP4, the integrated disc 100G is loaded into the initialization apparatus 1. The procedure then proceeds to the next step SP5.

At step SP5, tracking control and focus control are performed on the objective lens 40 with reference to the reference part 201 of the integrated disc 100G while servo information marks KS are formed in the recording layer 101. The procedure then proceeds to the next step SP6.

At step SP6, the initialization reference plate 200 is removed from the integrated disc 100G to separate the optical disc 100 that has servo information marks KS. The procedure proceeds to the next step SP6 to end the initialization processing.

(1-8) Operation and Effect

With the foregoing configuration, the initialization apparatus 1 rotates the integrated disc 100G which is formed by temporarily fixing the initialization reference plate 200 to the uninitialized optical disc 100X, an optical disc to be irradiated with a light beam LB of light of predetermined or higher intensity to record information as recording marks RM.

The initialization reference plate 200 has the reference part 201 which reflects the servo light beam LS, or servo light intended for servo control. The reference part 201 contains information that indicates the positions of tracks TR of the optical disc 100 for recording marks RM to be formed on, as servo tracks of pit-and-projection pattern.

When the initialization apparatus 1 collects the servo light beam LS and the information light beam LI through the objective lens 40 and irradiates the integrated disc 100G with the light beams LS and LI, the initialization apparatus 1 drives the objective lens 40 so that the servo light beam LS focuses on a desired servo track at a desired servo position of the reference part 201.

The initialization apparatus 1 can thus situate the focal point FI of the information light beam LI upon the front side of the desired servo track, thereby adjusting the focal point FI to the target position SG in the tracking direction.

The initialization apparatus 1 also adjusts the state of convergence of the information light beam LI, thereby adjusting the spherical aberration so that the focal point FI of the information light beam LI is separated from the focal point FS of the servo light beam LS by an arbitrary distance in the depth direction (i.e., focus direction).

Consequently, the initialization apparatus 1 can situate the focal point FI at the target depth with reference to the reference part 201, thereby adjusting the focal point FI to the target position SG in the focus direction.

The initialization apparatus 1 then irradiates the uninitialized optical disc 100X with the information light beam LI at servo mark areas As where to form servo information marks KS which are recording marks intended for servo control.

The initialization apparatus 1 can thus record the servo information marks KS on the servo mark areas As of the uninitialized optical disc 100X with reference to the reference part 201 of the initialization reference plate 200.

As a result, it is possible to perform servo control on the light beam LB by using the servo information marks KS even though the optical disc 100 having the servo information marks KS, obtained by removing the initialization reference plate 200 from the integrated disc 100G, has no reflecting layer.

The initialization apparatus 1 moves the focal point FI of the information light beam LI by displacing the movable lens 58A of the relay lens 58 according to the positions of the servo mark areas As of the uninitialized optical disc 100X in the focus direction (i.e., target positions SG).

The initialization apparatus 1 can thus form the servo information marks KS in each of the mark recording layers Y of the uninitialized optical disc 100X where a plurality of recording marks RM are supposed to be formed in the focus direction.

The initialization apparatus 1 projects the information light beam LI to the servo mark areas As which are to be formed intermittently across the entire recording area 100W of the optical disc 100 for information to be recorded on. The initialization apparatus 1 can thus form the servo mark areas As intermittently across the entire recording area 100W. This consequently makes it possible for an optical disc apparatus that performs information recording on the optical disc 100 to control the focal position of the light beam LB across the entire recording area 100W by using the servo information marks KS.

More specifically, when the optical disc apparatus rotates the optical disc 100 and collects a light beam LB to irradiate the recording layer 101 with it, the optical disc apparatus displaces the lens position of its objective lens OL so that the light beam LB focuses on the position of irradiation based on the reflected light beam LBR from a servo mark area As. The optical disc apparatus then irradiates a recording area Aw with the light beam LB, with the lens position fixed to the displaced position.

The optical disc apparatus can thus irradiate the recording area Aw with the light beam LB at the same position as the servo mark area As is. Here, the servo mark area As and the recording area Aw adjoin each other, and their irradiation lines TL are linearly continuous.

When the optical disc 100 is rotated, the focal point FI of the light beam LB that is adjusted to focus on the irradiation line TL of the servo mark area As therefore focuses on the vicinity of the irradiation line TL of the recording area Aw. Consequently, the optical disc apparatus can irradiate the recording area Aw on the target track TRG with the light beam LB, thereby forming recording marks RM.

The integrated disc 100G loaded in the initialization apparatus 1 is fixed by the adhesive sheets 210 which are interposed between the uninitialized optical disc 100X and the initialization reference plate 200.

The integrated disc 100G can thus be manufactured by the simple operation of only bonding the uninitialized optical disc 100X and the initialization reference plate 200 with the adhesive sheets 210.

In the integrated disc 100G, the adhesive sheets 210 are attached to the portions where no servo mark areas As are formed in the uninitialized optical disc 100X. Since the integrated disc 100G precludes the information light beam LI from being passed through the adhesive sheets 210, consideration need not be given to the optical characteristics of the adhesive sheets 210, which allows more freedom of choice of the adhesive sheets 210.

In the first embodiment of the present invention, the initialization reference plate 200 is initially fixed to the uninitialized optical disc 100X. The objective lens 40 for collecting the servo light beam LS and the information light beam LI is then driven so that the servo light beam LS focuses on a desired servo track of the reference part 201. The spherical aberration of the information light beam LI is adjusted so that the focal point FI of the information light beam LI is separated from the focal point FS of the servo light beam LS by an arbitrary distance in the focus direction. The focal point FI of the information light beam LI is thus adjusted to the servo mark areas As, and the servo mark areas As are irradiated with the information light beam LI to form servo information marks KS. Subsequently, the initialization reference plate 200 is separated from the optical disc 100 that is completely initialized.

This makes it possible to form the servo information marks KS in the uninitialized optical disc 100X even though the uninitialized optical disc 100X has no reflecting layer.

The initialization reference plate 200 has the reference part 201 that is formed so as to correspond to the recording area 100W of the optical disc 100 where the servo mark areas As are formed. The reference part 201 contains information for indicating the positions of tracks TR of the optical disc 100 for recording marks RM to be formed on, and reflects at least a part of the predetermined servo light beam LS.

Consequently, when the initialization reference plate 200 is integrated with the uninitialized optical disc 100X, the reference part 201 can be used instead of a reflecting surface to form servo information marks KS.

The initialization reference plate 200 has the alignment holes 200E intended for alignment in an area that includes no reference part 201. Protrusions can thus be passed through the initialization reference plate 200 along with the alignment holes 100E that are similarly formed in the uninitialized optical disc 100X, whereby the recording area 100W of the uninitialized optical disc 100X and the reference part 201 are aligned to each other by the simple operation.

With the foregoing configuration, the initialization apparatus 1 forms servo information marks KS with reference to the reference part 201, with the initialization reference plate 200 having the reference part 201 temporarily fixed to the uninitialized optical disc 100X which has no reflecting layer.

Since servo control can be performed based on the servo information marks KS, it is possible to achieve an initialization apparatus for manufacturing an optical disc in which a target mark position inside a recording layer can be irradiated with an information light beam without a reflecting layer being irradiated with a servo light beam.

(1-9) Other Embodiments

The foregoing first embodiment has dealt with the case where the adhesive sheets 210 are only attached to the fringe area 100D and the center area 100C that do not correspond to the recording area 100W. However, the present invention is not limited thereto. For example, an adhesive sheet 210 may be attached to almost the entire surface of the uninitialized optical disc 100X.

The foregoing first embodiment has also dealt with the case where the adhesive sheets 210 are low-tack two-sided adhesive sheets. The present invention is not limited thereto, however, and may use various other types of adhesive sheets such as a hot-melt adhesive sheet.

The foregoing first embodiment has also dealt with the case where the initialization reference plate 200 has a disc shape. However, the present invention is not limited thereto. For example, the initialization reference plate 200 may have a square or rectangular plate shape.

The foregoing first embodiment has also dealt with the case where the uninitialized optical disc 100X and the initialization reference plate 200 are aligned by passing a jig through the alignment holes 100E and 200E. However, the present invention is not limited thereto. For example, the initialization reference plate 200 may be provided with an alignment protrusion of cylindrical shape having generally the same diameter as that of the hole part 100H, in the portion corresponding to the hole part 100H which is formed in the center of the uninitialized optical disc 100X. The alignment protrusion can be fitted into the hole part 100H for alignment.

The foregoing first embodiment has also dealt with the case where the reference part 201 is only formed in the portion of the initialization reference plate 200 corresponding to the recording area 100W. However, the present invention is not limited thereto. For example, the reference part 201 may be formed almost all over the initialization reference plate 200.

The foregoing first embodiment has also dealt with the case where the reference part 201 reflects almost all of the servo light beam LS. However, the present invention is not limited thereto. The reference part 201 has only to reflect at least a part of the servo light beam LS.

The foregoing first embodiment has also dealt with the case where a plurality of mark recording layers Y are formed in the optical disc 100. The present invention is not limited thereto, however, and only a single mark recording layer Y may be formed. In this case, the focal point FI of the information light beam LI need not necessarily be displaced as long as it is separated from the focal point FS of the servo light beam LS by a predetermined distance.

The foregoing first embodiment has also dealt with the case where the movable lens 58A is used as a focal point separating unit that separates the focal point FI of the information light beam LI. However, the present invention is not limited thereto. It is only necessary to provide a spherical aberration generating unit that adds a spherical aberration to the information light beam LI. Various types of optical elements may thus be used, including phase modulation elements for changing the phase of the information light beam LI such as a diffractive element and a liquid crystal element, and expanders. Such optical elements may be moved as well.

The foregoing first embodiment has also dealt with the case where the servo mark areas As are formed in mutually adjacent positions on adjoining tracks TR, so that the servo information lines KL including series of servo information marks KS are formed in a radial configuration from the center of the optical disc 100. However, the present invention is not limited thereto. The servo mark areas As may be formed at predetermined intervals HK between the tracks TR so that the servo mark areas As are discontinuous in view of the tracks TR. Servo mark areas As and recording area Aw may be formed along concentric tracks TR alternately. In this case, the initialization reference plate 200 has concentric servo tracks.

The foregoing first embodiment has also dealt with the case where the servo tracks as the information for indicating the radial positions of tracks TR are made of pits and projections. However, the present invention is not limited thereto. For example, the servo tracks may be formed by changing the reflectance of a flat reflecting layer.

The foregoing first embodiment has also dealt with the case where the tracking marks KSt, focusing marks KSf, and address information marks KSa are formed as the servo information marks KS. However, the present invention is not limited thereto. It is only necessary to perform tracking control and focus control on the objective lens 40, and the address information marks KSa are not indispensable. Marks for achieving both tracking control and focus control at the same time may be formed.

The foregoing first embodiment has also dealt with the case where recording marks RM made of pores are formed in the recording areas Aw as stereoscopic recording marks. However, the present invention is not limited thereto. For example, stereoscopic recording marks may be formed by collapsing holograms that have been recorded on the recording areas Aw in advance.

A light beam emitted from a single light source may be separated into two and projected from respective opposite directions to form a hologram as a stereoscopic recording mark. The configuration of such an optical disc apparatus that records a hologram as a recording mark has been described in patent document 1.

The foregoing first embodiment has also dealt with the case where the servo light beam LS has a wavelength of approximately 660 nm and the information light beam LI has a wavelength of approximately 405 mm. The present invention is not limited thereto, however, and may use other wavelengths. The servo light beam LS and the information light beam LI may have the same wavelength. For example, in this case, laser light emitted from an identical laser diode may be separated into two light beams and used as the servo light beam LS and the information light beam LI, respectively.

The foregoing first embodiment has also dealt with the case where the tracking control is performed by the push pull method. However, the present invention is not limited thereto. For example, tracking control may be performed by the differential phase detection (DPD) method or the differential push pull (DPP) method. Various other techniques may be used for tracking control as well.

The foregoing first embodiment has also dealt with the case where the focus error signal SFE is generated by the astigmatic aberration method. However, the present invention is not limited thereto. The focus error signal SFE may be generated by various other techniques such as a spot size method.

The foregoing first embodiment has also dealt with the case where the optical disc 100 is provided with the substrates 102 and 103. However, the present invention is not limited thereto. For example, either one or both of the substrates 102 and 103 may be omitted if the recording layer 101 has a sufficient strength.

The foregoing first embodiment has also dealt with the case where the initialization reference plate 200 is provided with the substrates 202 and 203. However, the present invention is not limited thereto. For example, either one of the substrates 202 and 203 may be omitted if the strength is sufficient.

The foregoing first embodiment has also dealt with the case where the initialization apparatus 1 as an initialization apparatus includes the spindle motor 5 as a rotating unit, the objective lens 40 as an objective lens, the actuator 40A as an objective lens driving unit, and the control unit 2 as a control unit. However, the present invention is not limited thereto. The initialization apparatus according to the first embodiment of the present invention may be composed of a rotating unit, objective lens, objective lens driving unit, and control unit of various other configurations.

The foregoing first embodiment has also dealt with the case where the initialization reference plate 200 as an initialization reference plate includes the reference part 201 as a reference part. However, the present invention is not limited thereto. The initialization reference plate according to the first embodiment of the present invention may include a reference part of various other configurations.

(2) Second Embodiment

FIGS. 22A to 28 show a second embodiment. Parts corresponding to those of the first embodiment shown in FIGS. 2 to 21 will be designated by like reference numerals. The second embodiment differs from the first embodiment in the method of fixing an optical disc 110 and an initialization reference plate 220, and in that the servo mark areas As are formed only on the radially inner side of the optical disc 110.

(2-1) Configuration of Optical Disc

Figure 22A:
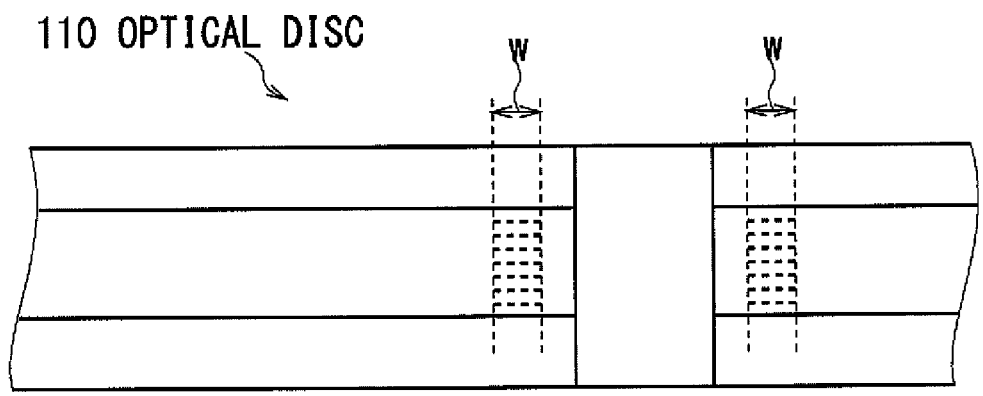
FIGS. 22A and 22B are schematic diagrams for explaining the collection of light beams according to a second embodiment.
Figure 22B:
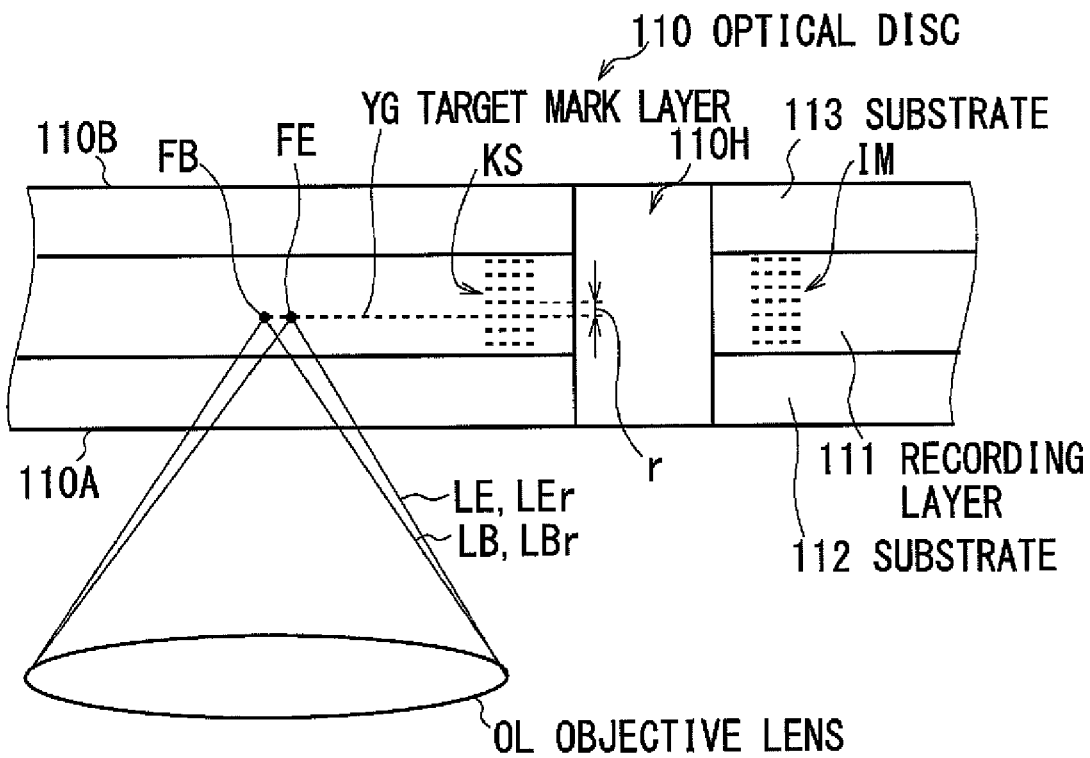

As shown in FIGS. 22A and 22B, the optical disc 110 is formed by sandwiching a recording layer 111 of uniform configuration between substrates 112 and 113 like the optical disc 100 according to the first embodiment. A hole part 110H intended for chucking is formed in the center.

As shown in FIG. 22A, the optical disc 110 is provided with servo information marks KS in advance, at a radially inner portion (hereinafter referred to as a lead-in area RA) of each of the mark layers Y to be formed in the recording layer 111.

The servo information marks KS are formed over several tracks from the radially inner side. When a recording mark RM is recorded on an information-recording portion (hereinafter, referred to as a data area) of each mark layer Y for the first time, the recording mark RM is recorded next to the end portion of the servo information marks KS. Note that the lead-in area RA is formed across a lead-in width of w in the tracking direction.

In the lead-in area RA, servo mark areas As having servo information marks KS formed therein and recording mark areas Aw for information to be recorded on are alternately formed as in the first embodiment.

Here, the optical disc 110 has no servo information mark KS other than in the lead-in area RA. That is, aside from the foregoing recording mark areas Aw in the lead-in area RA, the optical disc 110 also has a recording mark area Aw over the entire area other than the lead-in area RA.

The recording mark areas Aw in the lead-in area are intended to store such information as a table of contents (TOC). For example, the TOC includes address information on data that is recorded on each mark layer Y, end address information on actually-recorded information, and next addresses to start information recording.

Data is successively recorded on the optical disc 110 from a first mark layer Y1 that lies on one side 110A of the recording layer 111. The lead-in area RA on the first mark layer Y1 of the optical disc 110 then contains TOC that includes a mark layer number and address information for indicating the point to start recording when writing additional data to the optical disc 110.

(2-2) Basic Principle of Focal Position Control

Next, description will be given of the principle of focal position control when recording information on such an optical disc 110.

To record information on the optical disc 110, the optical disc 110 is irradiated with a light beam LB in an optical disc apparatus ML (not shown).

The optical disc apparatus ML can form recording marks RM in various locations in the recording layer 111 by controlling the relative position of its objective lens OL with respect to the optical disc 110.

In fact, the optical disc apparatus ML forms a track TR of spiral shape in the recording layer 111 of the optical disc 110 while forming a plurality of recording marks RM in succession. The recording marks RM formed thus are arranged in a flat configuration generally in parallel with the disc surface of the optical disc 110 so that the recording marks RM constitute a mark layer Y.

The optical disc apparatus ML also changes the position of the focal point FB of the light beam LB in the thickness direction of the optical disc 110, thereby forming a plurality of mark layers Y in the recording layer 111. For example, the optical disc apparatus ML forms mark layers Y at predetermined layer intervals r from the one side 110A of the optical disc 110 in succession.

Figure 23:
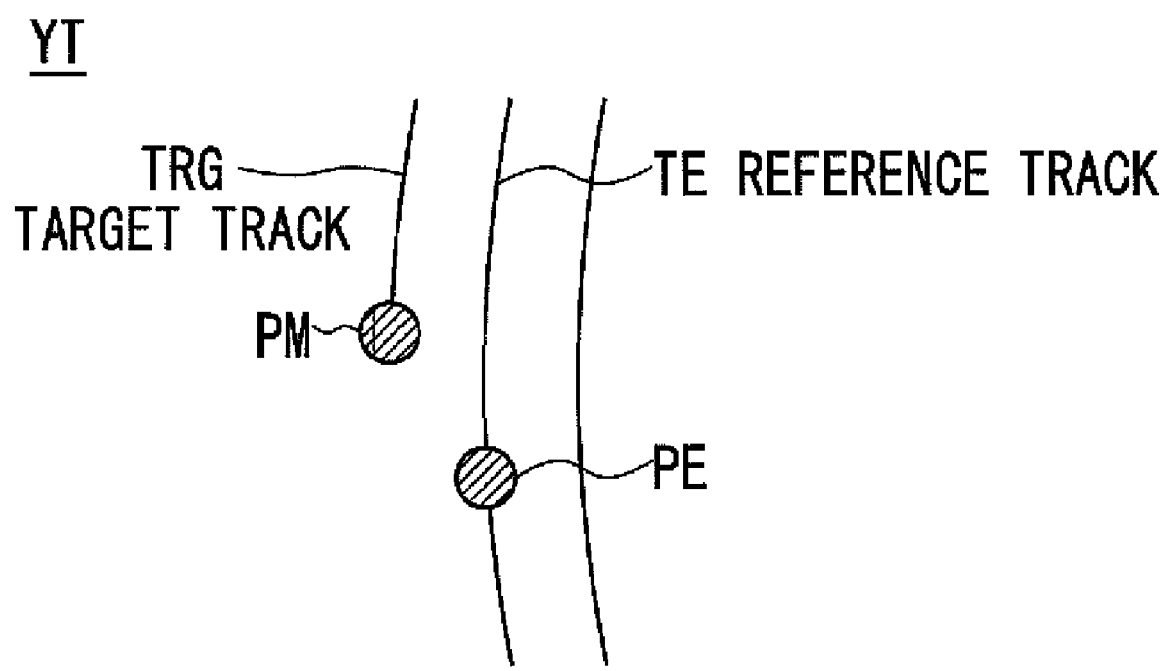
FIG. 23 is a schematic diagram for explaining the irradiation of a target mark layer with the light beams according to the second embodiment.
Figure 24:
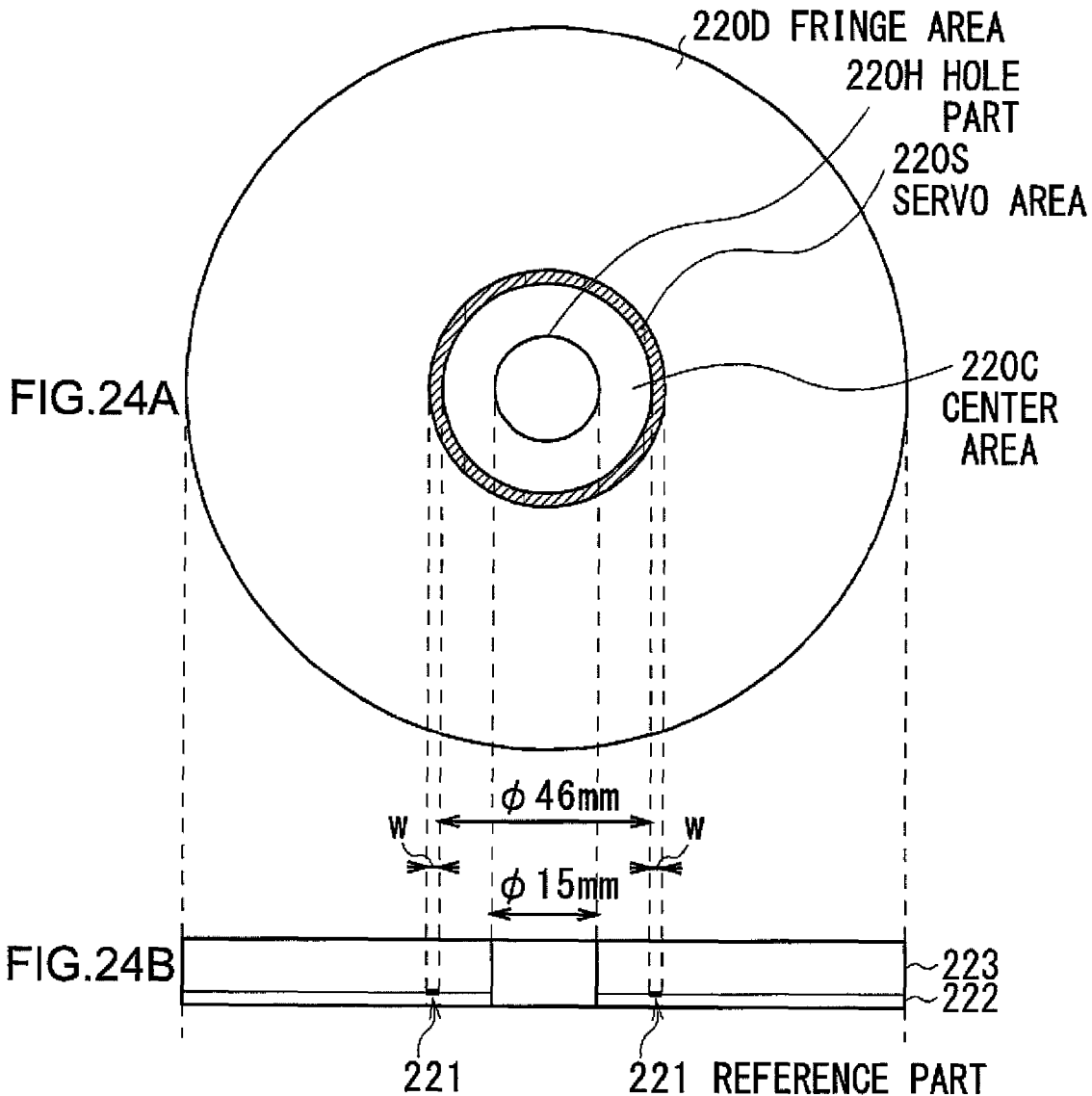
FIG. 24 is a schematic diagram showing the configuration (1) of an initialization reference plate according to the second embodiment.

In addition to the foregoing configuration, as shown in FIGS. 22A to 23, the optical disc apparatus ML collects a reference light beam LE different from the light beam LB to a reference track TE through the objective lens OL. The reference track TE refers to a track TR that is formed one track radially inside a target mark position PG on a mark layer Y that includes the target mark position PG (hereinafter, this mark layer will be referred to as a target mark layer YG).

Note that the optical disc apparatus ML successively records the recording marks RM from the radially inner side of the optical disc 110 in a spiral configuration. When forming a new recording mark RM on the target track TRG for information recording, there are surely recording marks RM formed one track radially inside the target track TRG. For this reason, the optical disc apparatus ML uses the track TR one track radially inside the target mark position PG as the reference track TE.

The reference light beam LE is reflected by a recording mark RM that constitutes the reference track TE, thereby becoming a reference reflected light beam LEr. The optical disc apparatus ML detects the reference reflected light beam LEr and performs position control on the objective lens OL based on the result of detection so that the reference light beam LE focuses on the reference track TE.

Specifically, the optical disc apparatus ML performs, for example, a position control of driving the objective lens OL in focus directions according to the astigmatic aberration method and a position control of driving the objective lens OL in tracking directions according to the push pull method. The focus directions refer to the directions toward and away from the optical disc 110. The tracking directions refer to the radial directions of the optical disc 110.

The optical disc apparatus ML also makes appropriate adjustments to such factors as the optical paths and the angles of divergence of the reference light beam LE and the light beam LB that are incident on the objective lens OL, so that the reference light beam LE collected by the objective lens OL has a focal point FE one track radially inside the focal point FB of the light beam LB.

More specifically, in the target mark layer YG of the optical disc 110, as shown in FIG. 23, the beam spot PM of the light beam LB is formed on the target track TRG and the beam spot PE of the reference light beam LE is formed on the reference track TE.

The optical disc apparatus ML then performs position control on the objective lens OL so that the reference light beam LE focuses on the previously-formed reference track TE. This can focus the light beam LB upon the target mark position PG on the target track TRG which lies one track radially outside the reference track TE.

The optical disc apparatus ML can adjust the interval between the reference track TE and the target track TRG to just as much as a single track. The optical disc apparatus ML thereby allows a significant reduction in the possibility of overwriting existing tracks TR accidentally, and can record recording marks RM on new tracks with the intervals between the tracks TR kept constant even if the optical disc 110 suffers a tilt or warpage.

As described above, the optical disc apparatus ML performs position control on the objective lens OL so that the reference light beam LE focuses on the reference track TE which is previously formed in the recording layer 101 of the optical disc 110. This makes it possible to focus the light beam LB upon the target mark position PG on the target track TRG.

(2-3) Configuration of Initialization Reference Plate

As shown in the external view of FIG. 24A and the cross-sectional view of FIG. 24B, the initialization reference plate 220 is formed in a disc shape with a diameter of approximately 120 mm like the optical disc 110 as a whole. A hole part 220H of approximately 15 mm in diameter is formed in the center.

As in the first embodiment, the initialization reference plate 220 is provided with a center area 220C, a servo area 220S, and a fringe area 220D from the center to the periphery. The initialization reference plate 220 also has a servo area 220S which is only formed across a lead-in width of w from the outer rim of the center area 220C so as to correspond to the lead-in area RA of the optical disc 110 where the servo mark areas As are formed.

The initialization reference plate 220 has a reference part 221 at the interface between substrates 222 and 223, across the area corresponding to the servo area 220S.

The reference part 221 reflects both an information light beam LI of blue laser light having a wavelength of 405 nm and a servo light beam LS of red laser light having a wavelength of 660 nm. The reference part 221 is provided with a servo track of spiral shape as in the first embodiment.

(2-4) Manufacturing and Loading of Integrated Disc

Figure 25:
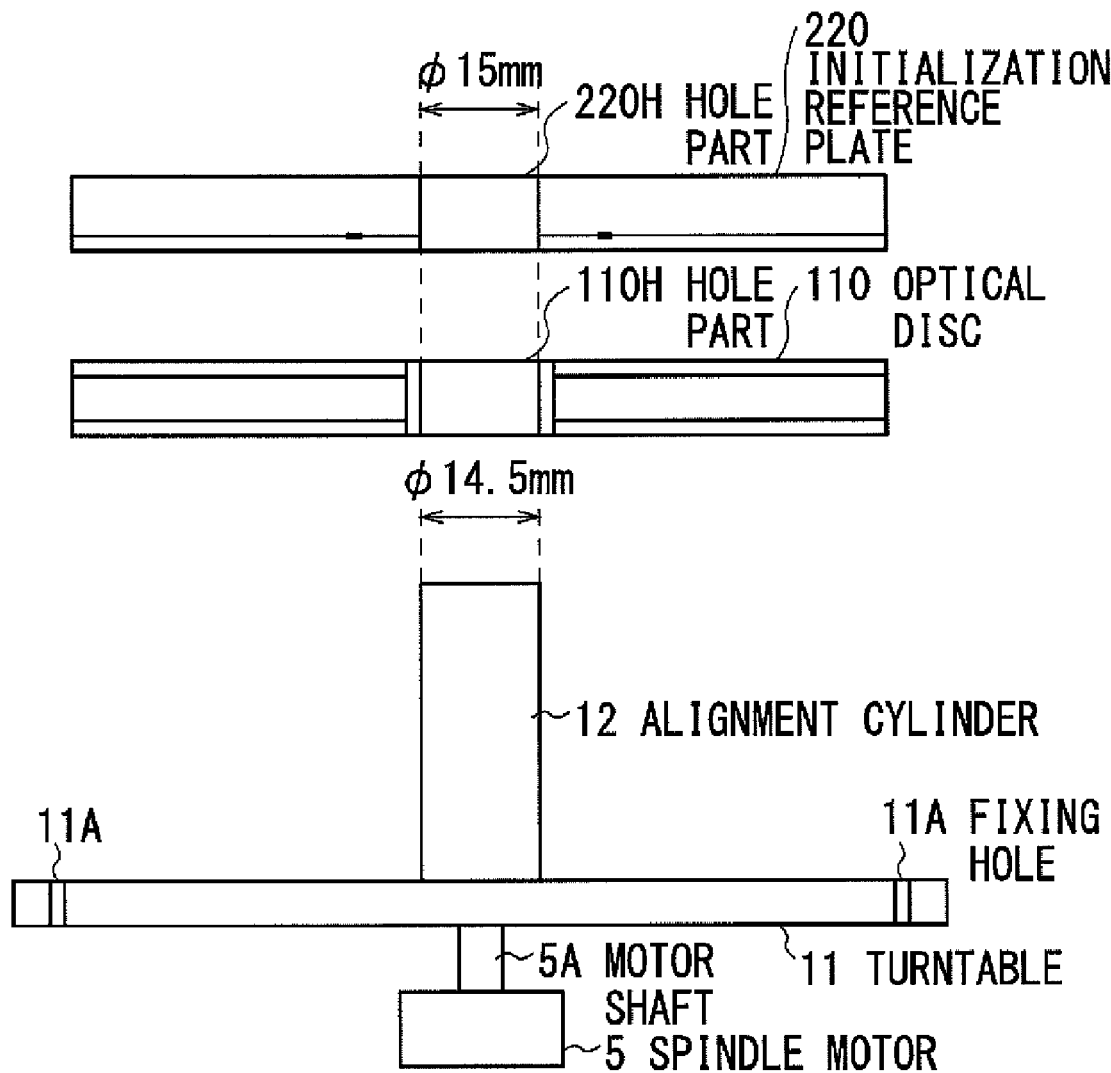
FIG. 25 is a schematic diagram for explaining alignment according to the second embodiment.

As shown in FIG. 25, an initialization apparatus 1X has a turntable 11 for the initialization reference plate 220 and an uninitialized optical disc 110X to be placed on, at the end of a motor shaft 5A which is provided on a spindle motor 5.

The turntable 11 is made of glass, polycarbonate, or the like, for example, and transmits the information light beam LI and the servo light beam LS with high transmittance. The turntable 11 has a disc shape of generally uniform thickness, and is formed greater than the disc 110 by, e.g., 40 mm or so. Four fixing holes 11A are formed in the turntable 11 at regular intervals, so as to pierce through the turntable 11 in the peripheral portions (portions outside the diameter of 120 mm).

The turntable 11 also has an alignment cylinder 12 at the center so as to protrude in the direction opposite from the spindle motor 5. The alignment cylinder 12 is formed with an outside diameter of approximately 14.5 mm, which is slightly smaller than the diameters, 15 mm, of the hole part 220H of the initialization reference plate 220 and the hole part 110H of the uninitialized optical disc 110X.

In the initialization apparatus 1X, the alignment cylinder 12 is passed through the hole part 110H of the optical disc 110 and the hole part 220H of the initialization reference plate 220 in succession, whereby the uninitialized optical disc 110X and the initialization reference plate 220 are placed. The initialization apparatus 1X can thus stack and align a recording area 110W formed in the uninitialized optical disc 110X and the servo area 220S formed in the initialization reference plate 220 to each other.

Figure 26A:
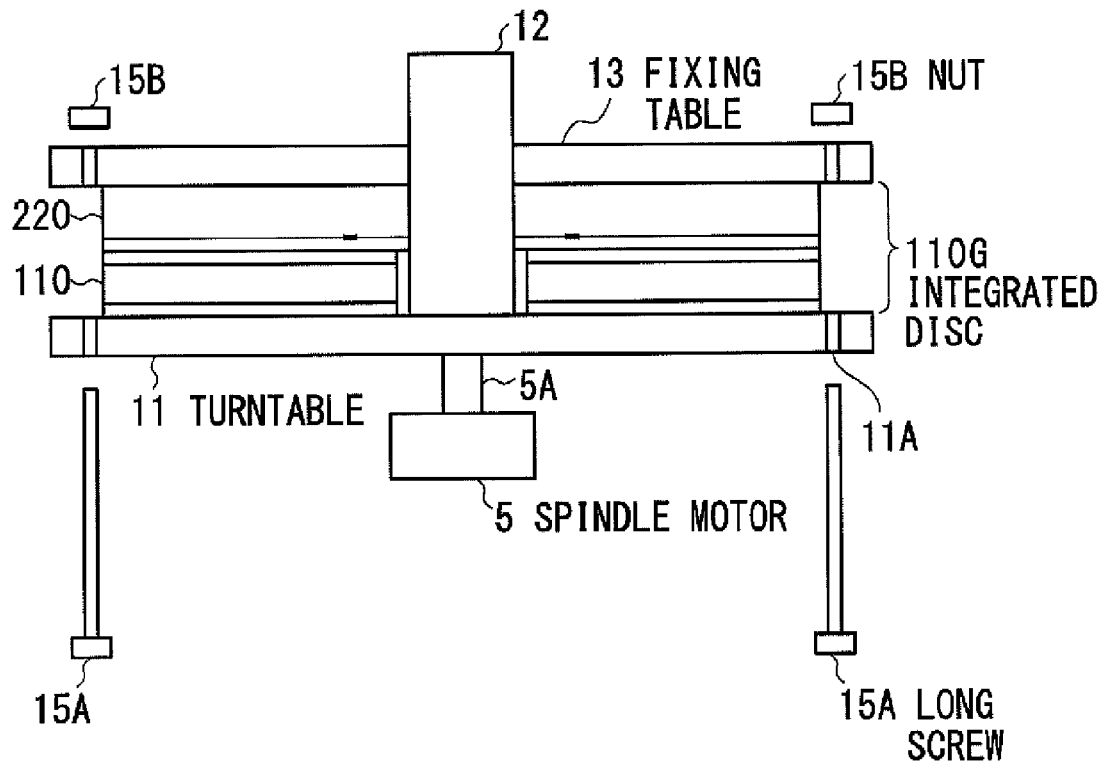
FIGS. 26A and 26B are schematic diagrams for explaining the manufacturing of an integrated disc according to the second embodiment.
Figure 26B:
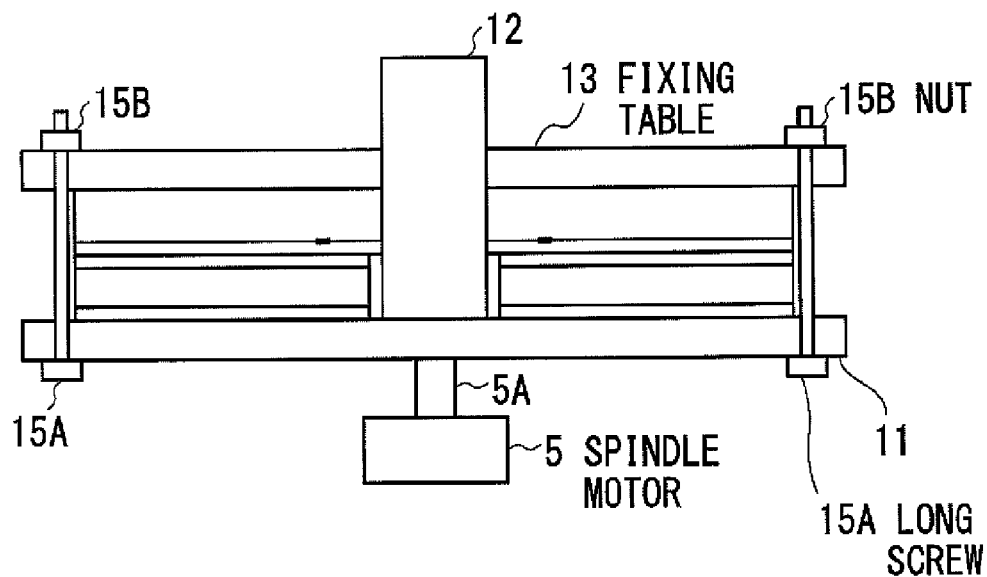

In the initialization apparatus 1X, as shown in FIG. 26A, a fixing table 13 having the same size and the same disc shape as those of the turntable 11 is aligned and placed with the alignment cylinder through a hole part in its center. In the initialization apparatus 1X, as shown in FIG. 26B, the turntable 11 and the fixing table 13 are fixed to each other by long screws 15A and nuts 15B through the fixing holes 11A.

Here, the long screws 15A and the nuts 15B apply pressure in such a direction that the turntable 11 and the fixing table 13 approach each other.

Consequently, the uninitialized optical disc 110X and the initialization reference plate 220 sandwiched between the turntable 11 and the fixing table 13 are put into close contact and fixed to each other, whereby an integrated disc 110G is formed and loaded on the initialization apparatus 1X.

The long screws 15A and the nuts 15B are in contact with the turntable 11 and the fixing table 13, but not with the uninitialized optical disc 110X or the initialization reference plate 220, and thus are prevented from damaging the uninitialized optical disc 110X and the initialization reference plate 220.

Figure 27:
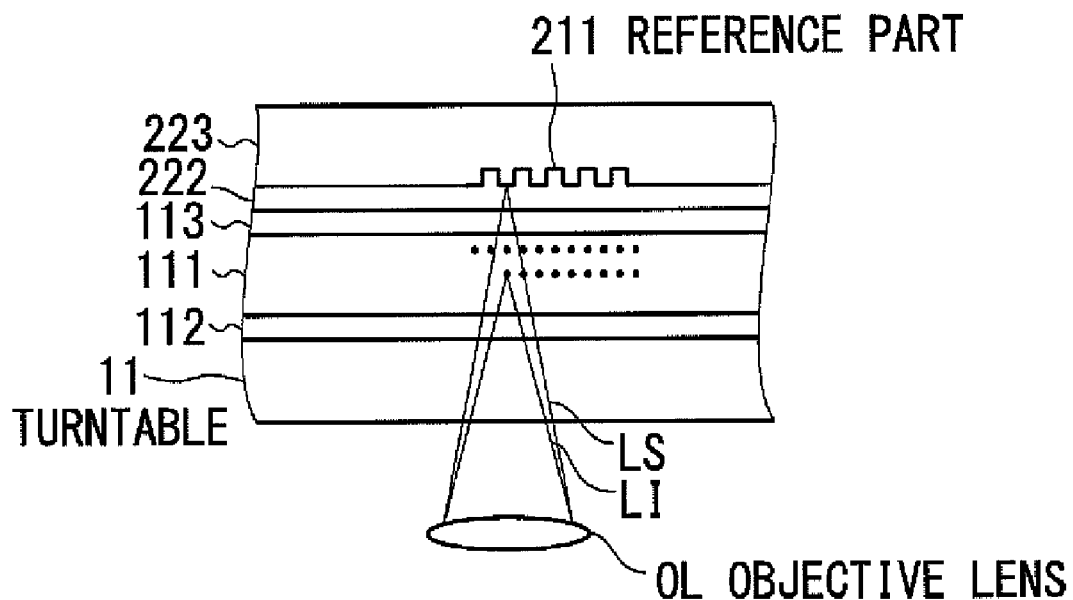
FIG. 27 is a schematic diagram for explaining the irradiation of the integrated disc with light beams according to the second embodiment.

As shown in FIG. 27, the initialization apparatus 1X irradiates the integrated disc 110G with the servo light beam LS and the information light beam LI through the turntable 11. The objective lens 40 of the initialization apparatus 1X is thus designed to the servo light beam LS and the information light beam LI that are transmitted through the turntable 11 before irradiating the integrated disc 110G.

When the integrated disc 110G is irradiated with the servo light beam LS from the side of the substrate 112 of the uninitialized optical disc 110X, the servo light beam LS is transmitted through the uninitialized optical disc 110X and the substrate 222 of the initialization reference plate 220, and a servo reflected light beam LSr is reflected from the reference part 221 to the side of the substrate 112.

When recording a servo information mark KS on the recording layer 111 of the integrated disc 110G, the servo light beam LS is collected by the position-controlled objective lens 40 so as to focus on a desired servo track of the reference part 221.

The integrated disc 110G is also irradiated with the information light beam LI of roughly the same optical axis through the same objective lens 40. This can situate the focal point FI of the information light beam LI on the "near" side of the desired servo track so that the focal point FI coincides with the target position SG in the tracking direction.

In the integrated disc 110G, the focal point FI of the information light beam LI is separated from the focal point FS of the servo light beam LS by a depth d corresponding to the target position SG. In the integrated disc 110G, the focal point FI can thus be adjusted to the target position SG in the focus direction.

As described above, when recording a servo information mark KS on the optical disc 110, the servo light beam LS intended for position control and the information light beam LI intended for information recording are used to form the servo information mark KS in the position where the recording layer 101 is irradiated with the focal point FI inside, i.e., in the target position SG at the target depth on the near side of the desired servo track of the reference part 221.

(2-5) Procedure of Initialization Processing

Figure 28:
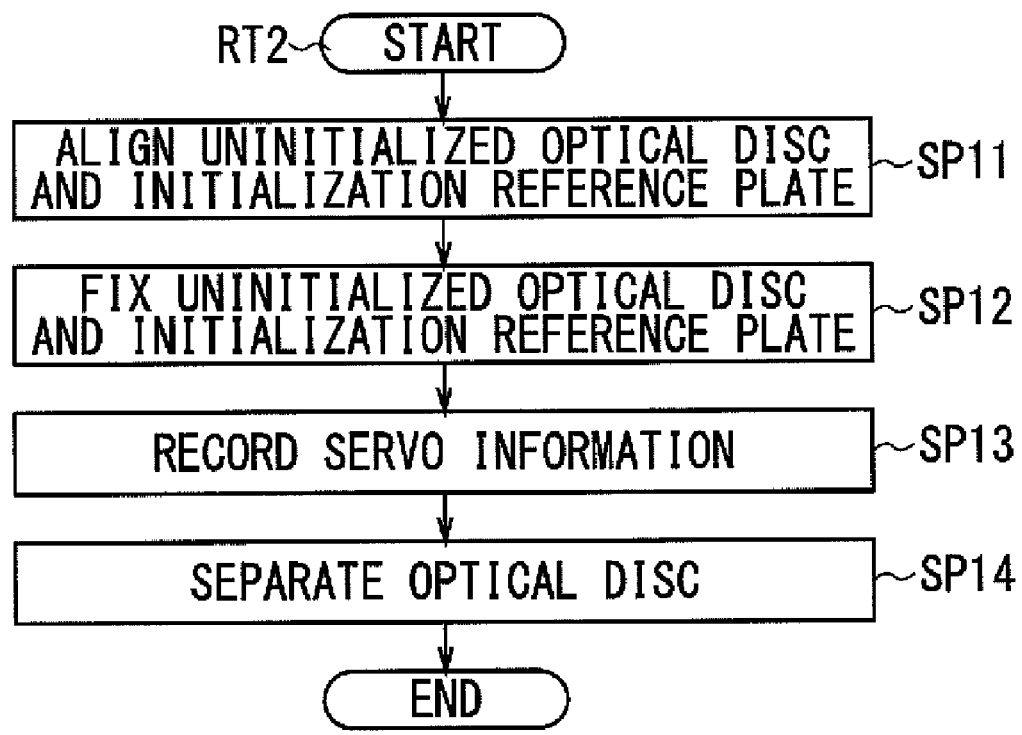
FIG. 28 is a flowchart for explaining the procedure of initialization processing according to the second embodiment.

Next, the procedure of initialization processing for forming servo information marks KS in the optical disc 110 will be described with reference to the flowchart shown in FIG. 28.

The initialization processing is started at the start step. Proceeding to step SP11, the alignment cylinder 12 is passed through the hole part 110H of the uninitialized optical disc 110X and the hole part 220H of the initialization reference plate 220 in succession, whereby the optical disc 110 and the initialization reference plate 220 are aligned to each other. The procedure then proceeds to the next step SP12.

At step SP12, the fixing table 13 is placed on the initialization reference plate 220. The optical disc 110 and the initialization reference plate 220 sandwiched between the turntable 11 and the fixing table 13 are compressed into close contact by the long screws 15A and the nuts 15B, whereby the integrated disc 110G is manufactured. The procedure then proceeds to the next step SP13.

At step SP13, tracking control and focus control are performed on the objective lens 40 with reference to the reference part 221 of the integrated disc 110G while servo information marks KS are formed in the recording layer 111. The procedure then proceeds to the next step SP14.

At step SP14, the initialization reference plate 220 is removed from the integrated disc 110G to separate the optical disc 110 that has servo information marks KS. The procedure proceeds to the end step to end the initialization processing.

(2-6) Operation and Effect

With the foregoing configuration, the uninitialized optical disc 110X to be loaded on the initialization apparatus 1X is stacked with the initialization reference plate 220 and interposed in this state between the turntable 11 and the fixing table 13, which are a first plate-like member and a second plate-like member greater than the uninitialized optical disc 110X, respectively. The long screws 15A and the nuts 15B are then tightened to press the turntable 11 and the fixed table 13 into mutually approaching directions, whereby the initialization reference plate 220 is temporality fixed to the uninitialized optical disc 110X.

The initialization apparatus 1X can thus irradiate the uninitialized optical disc 110X with the servo light beam LS and the information light beam LI through the turntable 11 of generally uniform thickness. This makes it possible to produce a spherical aberration that is generally uniform in the tracking direction and the tangential direction perpendicular to the tracking direction, so that servo information marks KS can be formed in uniform size.

The initialization apparatus 1X compresses the uninitialized optical disc 110X and the initialization reference plate 220 with a large area. As compared to the cases of fixing the uninitialized optical disc 110X and the initialization reference plate 220 directly, e.g., by using U-shaped jigs, the initialization apparatus 1X can thus prevent the application of local high pressure and suppress damage to the uninitialized optical disc 110X and the initialization reference plate 220.

The initialization apparatus 1X has the turntable 11 for the uninitialized optical disc 110X and the initialization reference plate 220 to be placed on, and the uninitialized optical disc 110X and the initialization reference plate 220 are fixed to the turntable 11.

The initialization apparatus 1X can thus fix the initialization reference plate 220 to the uninitialized optical disc 110X to manufacture the integrated disc 110G and load the integrated disc 110X on the initialization apparatus 1X at the same time.

The initialization apparatus 1X sandwiches the uninitialized optical disc 110X and the initialization reference plate 220 between the turntable 11 which has a greater size than that of the uninitialized optical disc 110X and the fixing table 13 which has a greater size than that of the uninitialized optical disc 100X. The initialization apparatus 1X further compresses the turntable 11 and the fixing table 13 in mutually approaching directions, thereby fixing the uninitialized optical disc 110X and the initialization reference plate 220 to the turntable 11.

This makes it possible for the initialization apparatus 1X to manufacture and load the integrated disc 110G by simple operations without damaging the uninitialized optical disc 110X and the initialization reference plate 200.

The turntable 11 of the initialization apparatus 1X has the alignment cylinder 12 which is a protrusion intended for alignment to be passed through the hole parts 110H and 220H formed in the respective centers of the uninitialized optical disc 110X and the initialization reference plate 220.

The initialization apparatus 1X can thus stack and align the lead-in area RA of the uninitialized optical disc 110X corresponding to the servo mark areas As and the servo area 220S of the initialization reference plate 220 to each other by the simple operation of only passing the alignment cylinder 12 through the hole parts 110H and 220H.

According to the foregoing configuration, the integrated disc 110G is fixed to the turntable 11 which is connected with the spindle motor 5 for rotating the integrated disc 110G. Since the integrated disc 110G can be loaded on the initialization apparatus 1X at a constant distance from the objective lens 40 at any time, the initialization apparatus 1X can form servo information marks KS in the uninitialized optical disc 110X with high accuracy.

(2-7) Other Embodiments

The foregoing second embodiment has dealt with the case where the uninitialized optical disc 110X and the initialization reference plate 220 are sandwiched between the turntable 11 and the fixing table 13. However, the present invention is not limited thereto. For example, the uninitialized optical disc 110X and the initialization reference plate 220 stacked together may be compressed from outside to inside by using jigs such as a clip so that the uninitialized optical disc 110X and the initialization reference plate 220 are fixed into the integrated disc 110G. In this case, the integrated disc 110G may be loaded by chucking, for example.

The foregoing second embodiment has also dealt with the case where the integrated disc 110G is fixed to the turntable 11. However, the present invention is not limited thereto. For example, the reference part 221 may be formed on the turntable, and the uninitialized optical disc 110X may be fixed to such a turntable to form an integrated disc.

The foregoing second embodiment has also dealt with the case where the turntable 11 and the fixing table 13 are fixed with the long screws 15A and the nuts 15B. However, the present invention is not limited thereto. For example, U-shaped jigs may be fitted onto the turntable 11 and the fixing table 13 from radially outside. Clips may be used. The number of fixing points has only to be at least two, not necessarily four. The fixing points are desirably arranged at generally regular intervals, whereas not limited thereto.

The foregoing second embodiment has also dealt with the case where the turntable 11 has a disc shape. However, the present invention is not limited thereto. The turntable has only to be a plate-like member of almost uniform thickness, and may have a rectangular, square, or polygonal shape, for example. The same holds for the fixing table 13, which may also have various shapes. The fixing table 13 will not be irradiated with the information light beam LI or the servo light beam LS, and therefore need not necessarily have a uniform thickness.

The foregoing second embodiment has also dealt with the case where the reference part 221 is only formed in the portion corresponding to the lead-in area RA. However, the present invention is not limited thereto. For example, the reference part 221 may be formed all over the initialization reference plate 220. This makes it possible for discs of different types, such as the uninitialized optical disc 100X of the first embodiment and the uninitialized optical disc 110X of the second embodiment, to share the initialization reference plate 220.

It is understood that while the foregoing first and second embodiments are different in various configurations, these configurations may be combined as appropriate.

Embodiments of the present invention may be applied to an optical disc apparatus that records information such as video, audio, and computer data onto an optical disc and reproduces the information from the optical disc.

The present application contains subject matter related to that disclosed in Japanese Priority Patent Application JP 2008-129734 filed in the Japan Patent Office on May 16, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for initializing an optical disc, comprising:
a rotating unit that rotates the optical disc and an initialization reference plate having a reference part with the initialization reference plate temporarily fixed to the optical disc, the reference part reflecting at least a part of servo light and containing address information;
an information light source that emits information light;
a servo light source that emits the servo light;
an objective lens that collects the servo light and the information light for irradiation;
an objective lens driving unit that drives the objective lens so that the servo light focuses on a desired servo position of the reference part;
a focal point separating unit that adjusts spherical aberration of the information light to separate a focal point of the information light from a focal point of the servo light by an arbitrary distance in a depth direction in which the objective lens approaches and draws away from the optical disc; and
a control unit that controls the information light source and the objective lens driving unit irradiated with the information light.

2. The apparatus for initializing an optical disc according to claim 1, wherein:
the optical disc to form a plurality of the recording marks in the depth direction; and
the focal point separating unit moves the focal point of the information light in accordance with a position of the servo mark area in the dept direction.

3. The apparatus for initializing an optical disc according to claim 1, wherein
the optical disc and the initialization reference plate are stacked and sandwiched between first and second plate-like members greater in size than the optical disc, and the first and second plate-like members are compressed in mutually approaching directions to fix the initialization reference plate to the optical disc temporarily.

4. The apparatus for initializing an optical disc according to claim 1, wherein
the rotating unit has a plate-like turntable for the optical disc and the initialization reference plate to be placed on, and fixes the optical disc and the initialization reference plate to the turntable.

5. The apparatus for initializing an optical disc according to claim 4, wherein
the rotating unit sandwiches the optical disc and the initialization reference plate between the turntable having a size greater than that of the optical disc and a plate-like fixing table having a size greater than that of the optical disc, and compresses the turntable and the fixing table in mutually approaching directions to fix the optical disc and the initialization reference plate to the turntable.

6. The apparatus for initializing an optical disc according to claim 4, wherein
the objective lens irradiates the servo mark area with the information light transmitted through the turntable.

7. The apparatus for initializing an optical disc according to claim 4, wherein
the turntable has a protrusion intended for alignment to be passed through hole parts formed in the respective centers of the optical disc and the initialization reference plate.

8. The apparatus for initializing an optical disc according to claim 1, wherein
the optical disc and the initialization reference plate are fixed with an adhesive sheet that is interposed between the optical disc and the initialization reference plate.

9. The apparatus for initializing an optical disc according to claim 8, wherein
the adhesive sheet is attached to a portion of the optical disc where the servo mark area is not formed.

10. The apparatus for initializing an optical disc according to claim 8, wherein
the adhesive sheet is attached to almost an entire surface of the optical disc.

11. The apparatus for initializing an optical disc according to claim 1, wherein
the control unit irradiates servo mark areas with the information light, the servo mark areas being formed intermittently across an entire recording area of the optical disc for information to be recorded on.

12. The apparatus for initializing an optical disc according to claim 1, wherein
the control unit irradiates a servo mark area with the information light, the servo mark area being only formed in a radially inner portion of a recording area of the optical disc for information to be recorded on.

13. A method of manufacturing an optical disc, comprising:
a fixing step of fixing an initialization reference plate having a reference part to the optical disc, the reference part reflecting at least a part of servo light and containing address information;
a servo control recording mark forming step of driving an objective lens that collects the servo light and information light so that the servo light focuses on the reference part, and adjusting spherical aberration of the information light to separate a focal point of the information light from a focal point of the servo light by an arbitrary distance in a depth direction in which the objective lens approaches and draws away from the optical disc and irradiating the servo mark area with the information light to form a recording mark intended for servo control; and
a separating step of separating the initialization reference plate from the optical disc.

14. An initialization reference plate comprising
a reference part that is formed so as to correspond to a servo mark area of an optical disc to be irradiated with light of predetermined or higher intensity to record information as a recording mark, contains information that indicates a position of a track of the optical disc for the recording mark to be recorded on, and reflects at least a part of predetermined servo light, the servo mark area for a recording mark intended for servo control to be recorded on.

15. The initialization reference plate according to claim 14, comprising
an alignment hole intended for alignment in an area where the reference part is not formed.

16. The initialization reference plate according to claim 14, comprising
a protrusion intended for alignment in a portion corresponding to a hole part formed in a center of the optical disc.

17. The initialization reference plate according to claim 14, wherein
the reference part is formed almost all over the initialization reference plate.

18. The initialization reference plate according to claim 14, wherein
the reference part is formed only in an area corresponding to the servo mark area.

* * * * *